United States Patent
Yao et al.

(10) Patent No.: US 8,947,403 B2
(45) Date of Patent: *Feb. 3, 2015

(54) IMAGE SENSING MODULE AND OPTICAL SENSING SYSTEM

(75) Inventors: Wen-Han Yao, Hsin-Chu (TW);
Chih-Hung Lu, Hsin-Chu (TW);
Tzung-Min Su, Hsin-Chu (TW);
Chih-Hsin Lin, Hsin-Chu (TW);
Shu-Sian Yang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 813 days.

This patent is subject to a terminal disclaimer.

(21) Appl. No.: 13/166,818

(22) Filed: Jun. 23, 2011

(65) Prior Publication Data

US 2012/0188203 A1     Jul. 26, 2012

(30) Foreign Application Priority Data

Jan. 25, 2011  (TW) ............................. 100102678 A

(51) Int. Cl.
*G06F 3/042* (2006.01)
(52) U.S. Cl.
CPC .................................. *G06F 3/0421* (2013.01)
USPC ........................................................ 345/175
(58) Field of Classification Search
None
See application file for complete search history.

(56) References Cited

U.S. PATENT DOCUMENTS

| 5,324,979 A * | 6/1994 | Rosenthal ................. 250/504 R |
| 6,901,166 B1 | 5/2005 | Nakayama |
| 7,206,137 B2 | 4/2007 | Nakatani |
| 7,218,780 B2 | 5/2007 | Nakayama |
| 7,248,293 B2 | 7/2007 | Iwasawa |
| 7,274,836 B1 | 9/2007 | Chien |
| 2007/0263174 A1 | 11/2007 | Shyu |
| 2007/0286055 A1* | 12/2007 | Yano ........................ 369/112.29 |
| 2008/0118110 A1 | 5/2008 | Simonsson |
| 2009/0090569 A1* | 4/2009 | Lin ............................. 178/18.09 |
| 2011/0109565 A1* | 5/2011 | Zhu et al. ...................... 345/173 |

FOREIGN PATENT DOCUMENTS

| TW | 452746 | 9/2001 |
| TW | 200744000 | 12/2007 |
| TW | I292052 | 1/2008 |
| TW | 200839623 | 10/2008 |

* cited by examiner

*Primary Examiner* — Kent Chang
*Assistant Examiner* — Nathan Brittingham
(74) *Attorney, Agent, or Firm* — Winston Hsu; Scott Margo

(57) ABSTRACT

An image sensing module utilizes an image sensor to sense objects and a mirror image of the objects in a mirror through a plurality of first light filtering components with a first transmission spectrum and a plurality of second light filtering components with a second transmission spectrum for generating an image. A light filtering module substantially having the first transmission spectrum is disposed in front of the mirror. The image includes a plurality of pixels. Each pixel includes a first sub data and a second sub data. The image sensing module utilizes an image sensing controller to detect real images corresponding to the objects and virtual images correspond to the mirror image of the objects from the image according to the first sub data and the second sub data of the plurality of pixels.

39 Claims, 27 Drawing Sheets

IMAGE SENSING MODULE AND OPTICAL SENSING SYSTEM

BACKGROUND OF THE INVENTION

1. Field of the Invention

The present invention relates to an image sensing module, and more particularly, to an image sensing module capable of determining a real image and a virtual image from received images.

2. Description of the Prior Art

FIG. 1 is a diagram showing an optical sensing system 100 of the prior art. The optical sensing system comprises a sensing area 116, a mirror 104, an image sensor 110, and a processing circuit 112. Two reflecting elements 106 and 108 are arranged at edges of the sensing area 116. The reflecting elements 106 and 108 are for reflecting light to the sensing area 116. The mirror 104 is for generating a mirror image of the sensing area 116. The mirror 104 can be a flat mirror with a mirror face 118 facing the sensing area 116. The image sensor 110 is arranged at a corner of the sensing area 116. A sensing range of the image sensor 110 comprises the sensing area 116. The processing circuit 112 is for computing a position of an object 102 according to images received by the image sensor 110 in order to generate an output coordinate $S_{xy}$.

FIG. 2 is a diagram illustrating operation principles of the optical sensing system 100. In FIG. 2, an upper part above the mirror 104 represents a mirror image generated by the mirror 104. A mirror image 106A is a mirror image of the reflecting elements 106. A mirror image 108A is a mirror image of the reflecting elements 108. A mirror image 110A is a mirror image of the image sensor 110. A mirror image 102A is a mirror image of the object 102. As shown in FIG. 2, the image sensor 110 receives a real image of the object 102 along a light path 204, and receives a mirror image 102A of the object 102 along a light path 206. FIG. 3 is a diagram showing an image captured by the image sensor 110 of FIG. 2. In FIG. 3, image 300 is an image captured by the image sensor 110. Because the image sensor 110 is arranged at a left side of the mirror, and a dark fringe 306 is closer to a left edge of the image 300 than a dark fringe 304, the processing circuit 112 can determine the dark fringe 304 corresponds to the real image of the object 102, and the dark fringe 306 corresponds to the mirror image 102A of the object 102, such that the processing circuit 112 can compute the position of the object 102 according to the dark fringes 304 and 306. The detailed computing method can be referred from U.S. Pat. No. 7,689,381. In addition, an area 302 is a bright area of the image 300 corresponding to light reflected from the mirror 104 and the reflecting elements 106 and 108. By comparing brightness of the bright area 302 and the dark fringes 304 and 306, the processing circuit 112 can obtain positions of the dark fringes 304 and 306 more accurately, in order to obtain the position of the object 102 precisely.

However, when the optical sensing system 100 is utilized to sense multiple objects, the processing circuit 112 is not able to distinguish the dark fringe corresponding to the real image of the object and the dark fringe corresponding to the mirror image of the object. FIG. 4 is a diagram showing a first situation of the optical sensing system 100 sensing two objects 102 and 103. FIG. 5 is a diagram showing a second situation of the optical sensing system 100 sensing two objects 102 and 103. FIG. 6A is a diagram showing an image 400 captured by the image sensor 110 of FIG. 4. FIG. 6B is a diagram showing an image 500 captured by the image sensor 110 of FIG. 5. As shown in FIG. 6A and FIG. 6B, the image 400 captured by the image sensor 110 of FIG. 4 is similar to the image 500 captured by the image sensor 110 of FIG. 5. The processing circuit 112 cannot determine the position of object 102 and the position of object 103, since there are two possible situations. That is, the processing circuit 112 cannot determine the dark fringes 404, 406, 504, and 506 correspond to the real images of the objects or the mirror images of the objects. In other words, the processing circuit 112 cannot determine the real images of the objects 102, 103 and the virtual images of the objects 102, 103, such that the processing circuit 112 cannot compute the position of object 102 and the position of object 103 correctly. The optical sensing system 100 of the prior art cannot be utilized to sense multiple objects for obtaining positions of the objects correctly.

SUMMARY OF THE INVENTION

The present invention provides an image sensing module. The image sensing module comprises a first light filtering module, an image sensor, and a sensing controller. The first light filtering module comprises a plurality of first light filtering components with a first transmission spectrum and a plurality of second light filtering components with a second transmission spectrum. The image sensor is for generating a first image by receiving an image of an object through the first light filtering module and receiving a mirror image of the object reflected from a mirror through the first light filtering module. A second light filtering module substantially having the first transmission spectrum is arranged in front of the mirror. The first image comprises a plurality of pixels, and each pixel comprises a first sub data corresponding to light transmitted through at least a first light filtering component and a second sub data corresponding to light transmitted through at least a second light filtering component. The sensing controller is electrically connected to the image sensor for determining a first set of real images of the object and a first set of virtual images of the object reflected from the mirror according to the first sub data and the second sub data of the plurality of pixels.

The present invention further provides an optical sensing system. The optical sensing system comprises a sensing area, a first light filtering module, a mirror, a first image sensing module, and a processing circuit. The sensing area has a plurality of edges. The first light filtering module has a first transmission spectrum. The mirror is for generating a mirror image of the sensing area by receiving and reflecting light through the first light filtering module. The first image sensing module comprises a second light filtering module, a first image sensor, and a first sensing controller. The second light filtering module comprises a plurality of first light filtering components with a first transmission spectrum and a plurality of second light filtering components with a second transmission spectrum. The first image sensor is for generating a first image by receiving an image of an object through the second light filtering module and receiving a mirror image of the object reflected from the mirror through the second light filtering module. The first image comprises a plurality of first pixels, and each first pixel comprises a first sub data corresponding to light transmitted through at least a first light filtering component and a second sub data corresponding to light transmitted through at least a second light filtering component. The first sensing controller is electrically connected to the first image sensor for determining a first set of real images of the object and a first set of virtual images of the object reflected from the mirror according to the first sub data and the second sub data of the plurality of first pixels. The processing circuit is electrically connected to the first sensing controller for generating a first set of candidate coordinates of the object according to the first set of real images and the first set of virtual images.

The present invention further provides an optical sensing system. The optical sensing system comprises a sensing area, a first light filtering module, a mirror, a first image sensing module, a second image sensing module, and a processing circuit. The sensing area has a plurality of edges. The first light filtering module has a first transmission spectrum. The mirror is for generating a mirror image of the sensing area by receiving and reflecting light through the first light filtering module. The first image sensing module comprises a second light filtering module, a first image sensor, and a first sensing controller. The second light filtering module comprises a plurality of first light filtering components with a first transmission spectrum and a plurality of second light filtering components with a second transmission spectrum. The first image sensor is for generating a first image by receiving an image of an object through the second light filtering module and receiving a mirror image of the object reflected from the mirror through the second light filtering module. The first image comprises a plurality of first pixels, and each first pixel comprises a first sub data corresponding to light transmitted through at least a first light filtering component and a second sub data corresponding to light transmitted through at least a second light filtering component. The first sensing controller is electrically connected to the first image sensor for determining a first set of real images of the object and a first set of virtual images of the object reflected from the mirror according to the first sub data and the second sub data of the plurality of first pixels. The second image sensing module comprises a third light filtering module, a second image sensor, and a second sensing controller. The third light filtering module comprises a plurality of third light filtering components with the first transmission spectrum and a plurality of fourth light filtering components with the second transmission spectrum. The second image sensor is for generating a second image by receiving an image of the object through the third light filtering module and receiving a mirror image of the object reflected from the mirror through the second light filtering module. The second image comprises a plurality of second pixels, and each second pixel comprises a third sub data corresponding to light transmitted through at least a third light filtering component and a fourth sub data corresponding to light transmitted through at least a fourth light filtering component. The second sensing controller is electrically connected to the second image sensor for determining a second set of real images of the object and a second set of virtual images of the object reflected from the mirror according to the third sub data and the fourth sub data of the plurality of second pixels. The processing circuit is electrically connected to the first sensing controller and the second sensing controller, for generating a set of real image candidate coordinates of the object according to the first set of real images and the second set of real images, and generating a set of virtual image candidate coordinates of the object according to the first set of virtual images and the second set of virtual images. The processing circuit further generates a set of output coordinates according to the set of real image candidate coordinates and the set of virtual image candidate coordinates.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
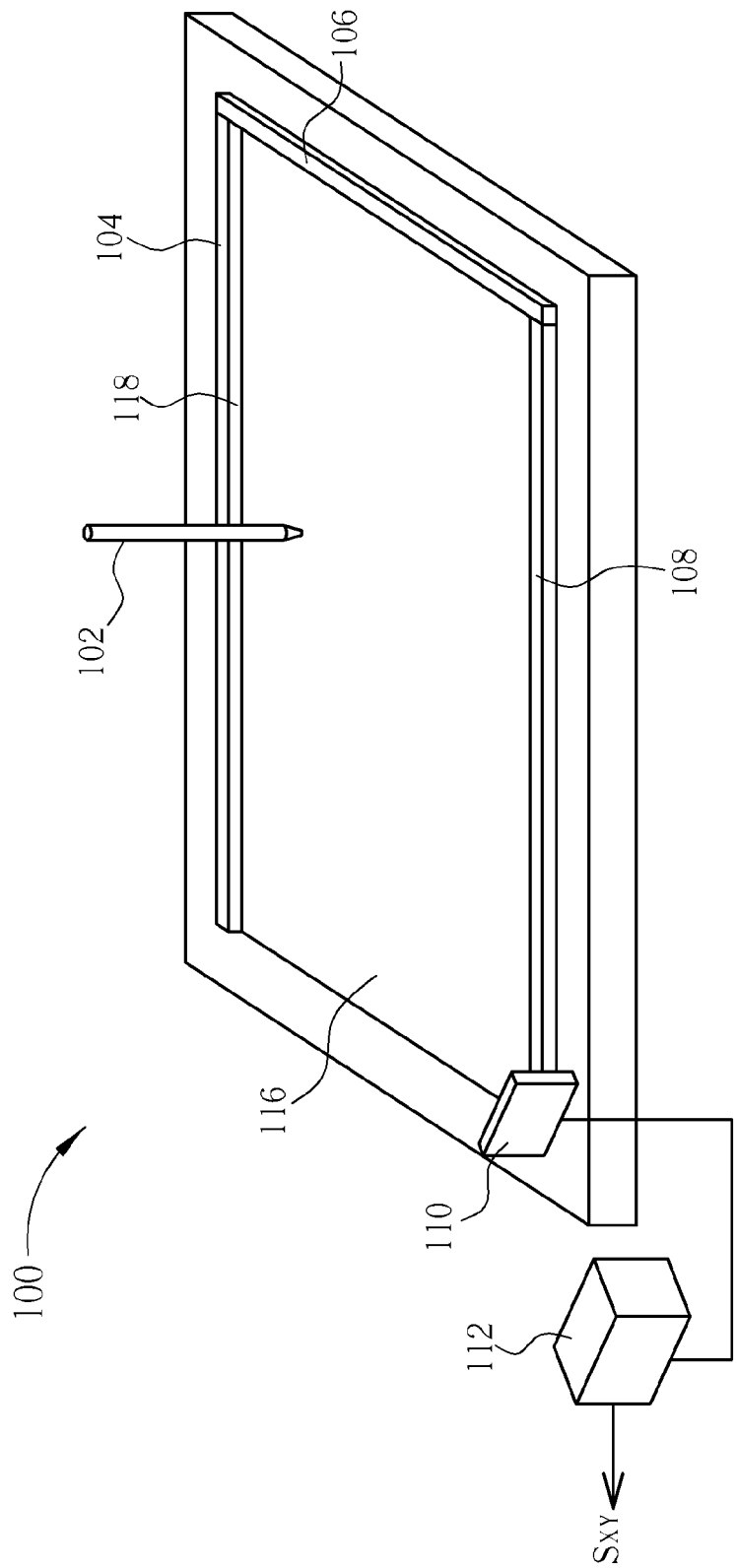
FIG. 1 is a diagram showing an optical sensing system of the prior art.
Figure 2:
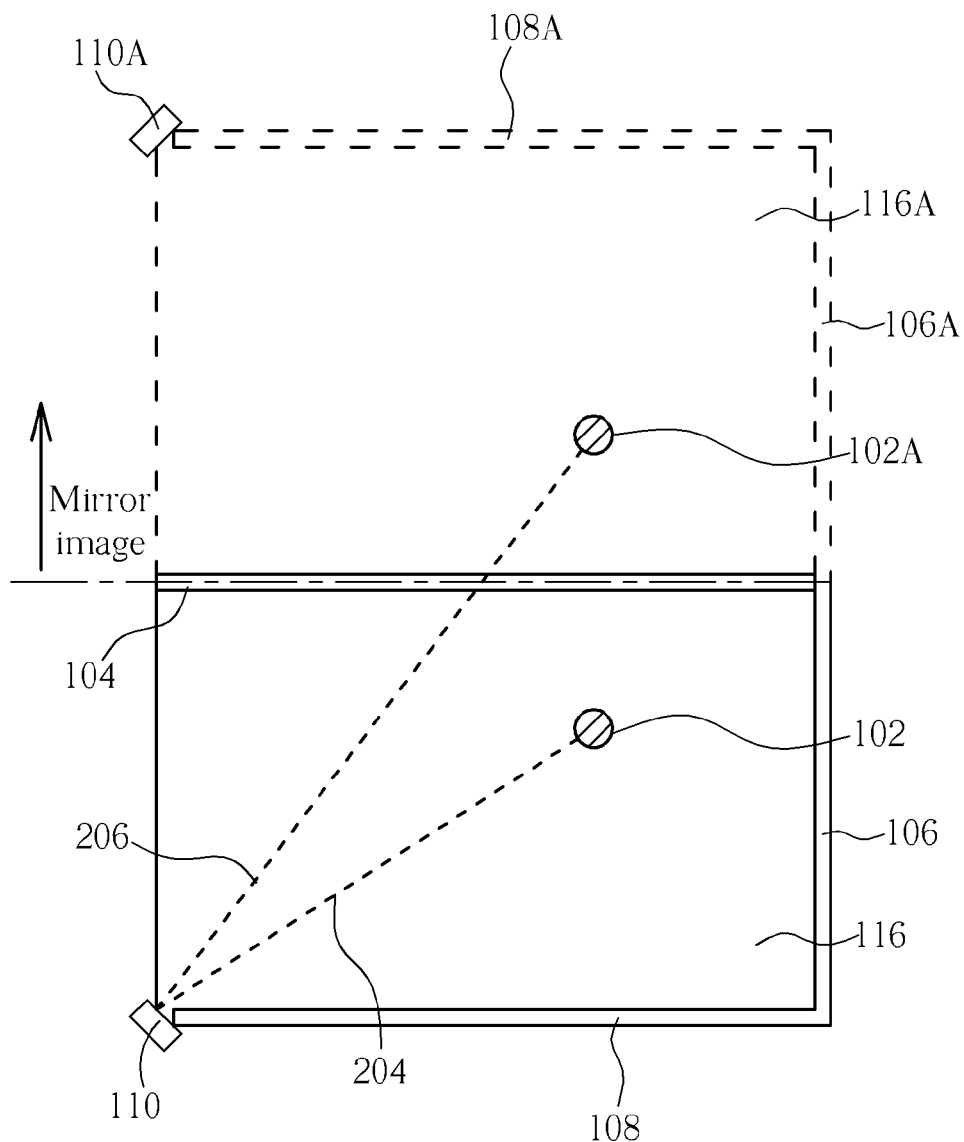
FIG. 2 is a diagram illustrating operation principle of the optical sensing system.
Figure 3:
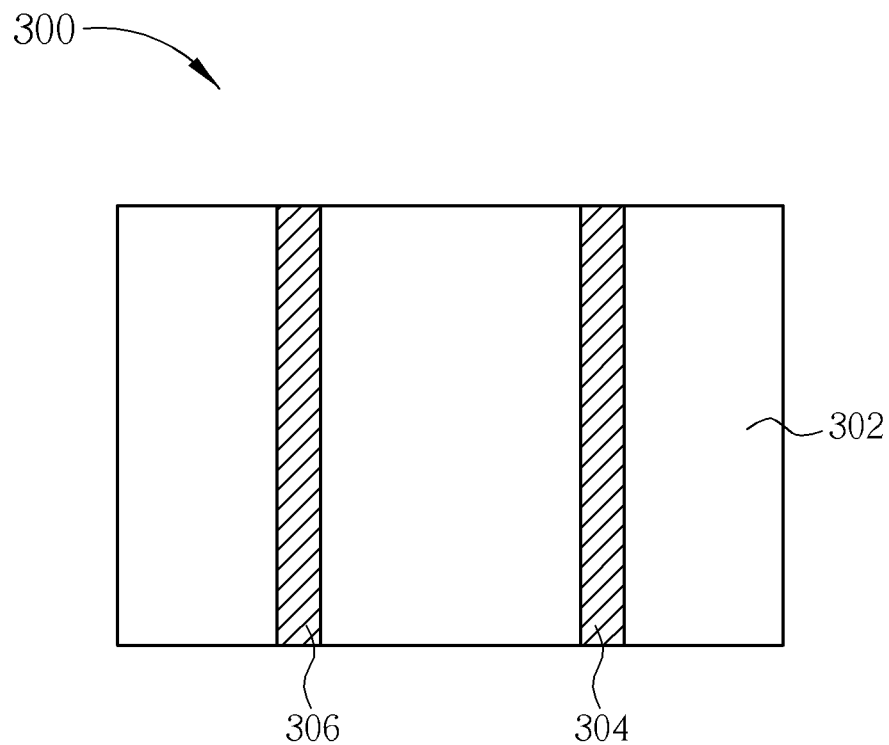
FIG. 3 is a diagram showing an image captured by the image sensor of FIG. 2.
Figure 4:
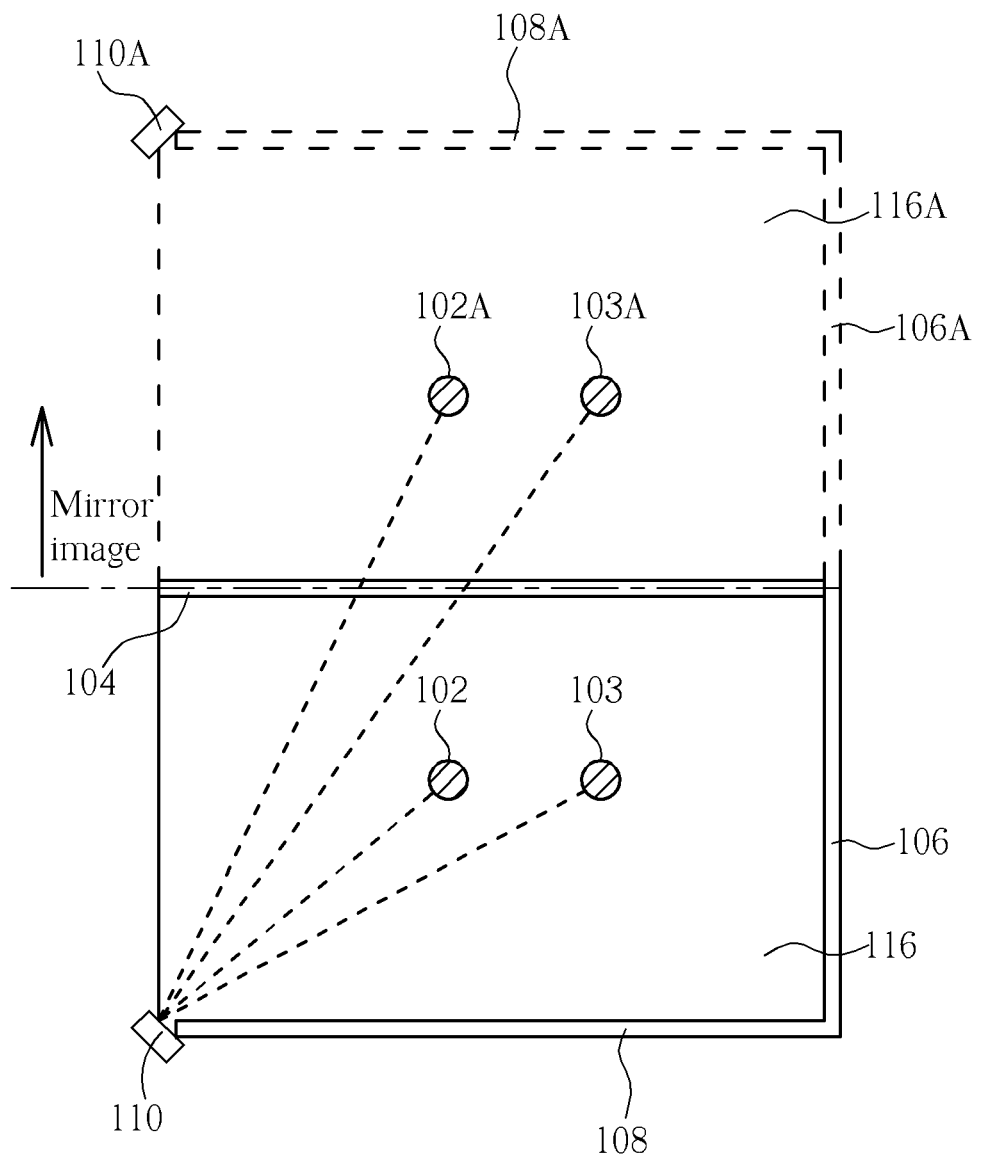
FIG. 4 is a diagram showing a first situation of the optical sensing system sensing two objects.
Figure 5:
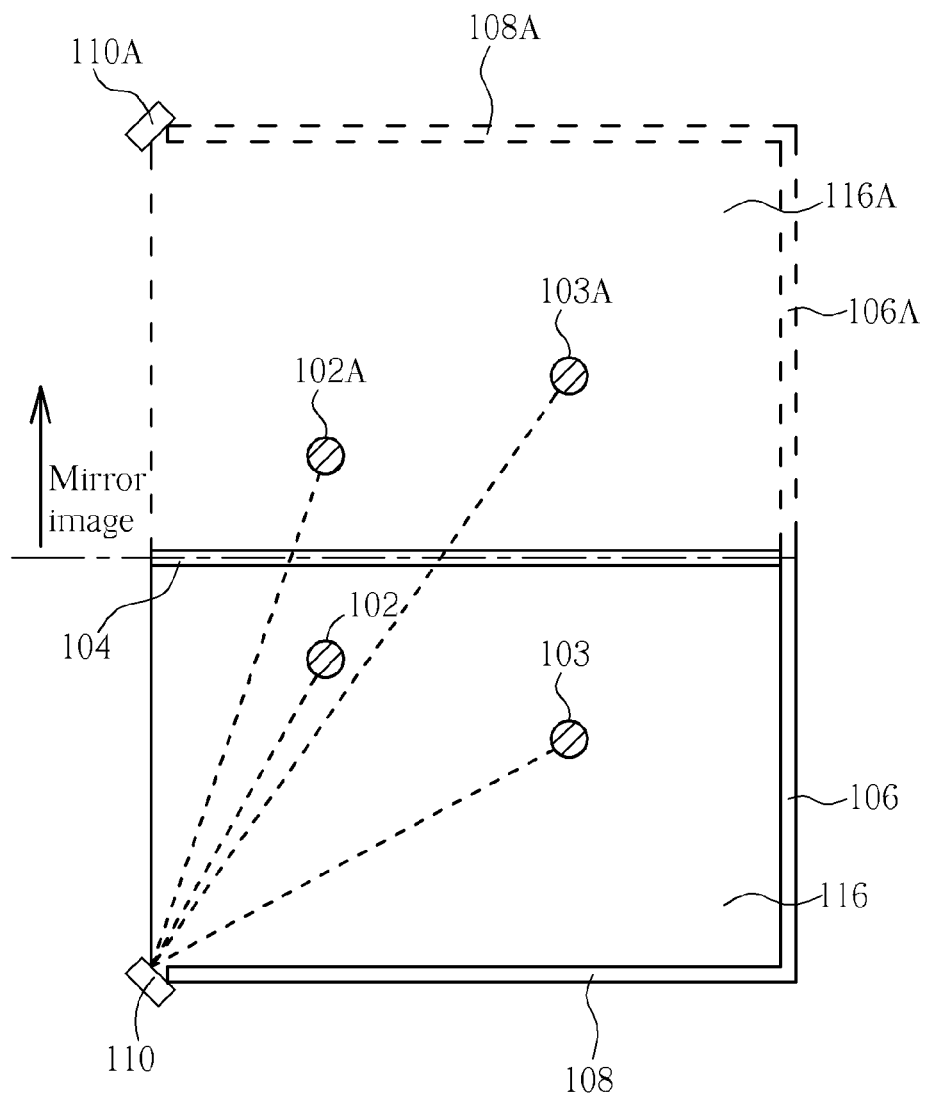
FIG. 5 is a diagram showing a second situation of the optical sensing system sensing the two objects.
Figure 6A:
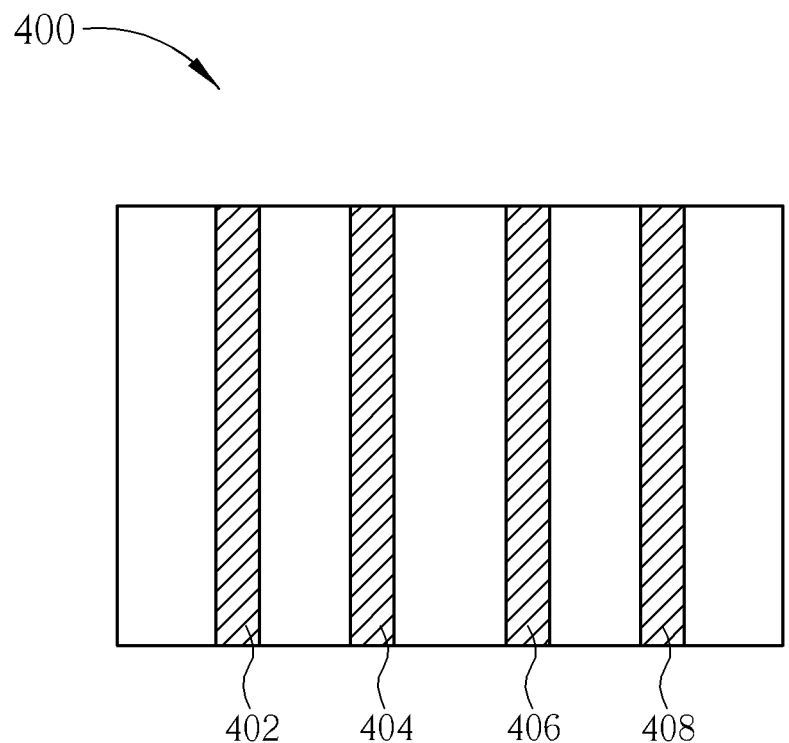
FIG. 6A is a diagram showing an image captured by the image sensor of FIG. 4.
Figure 6B:
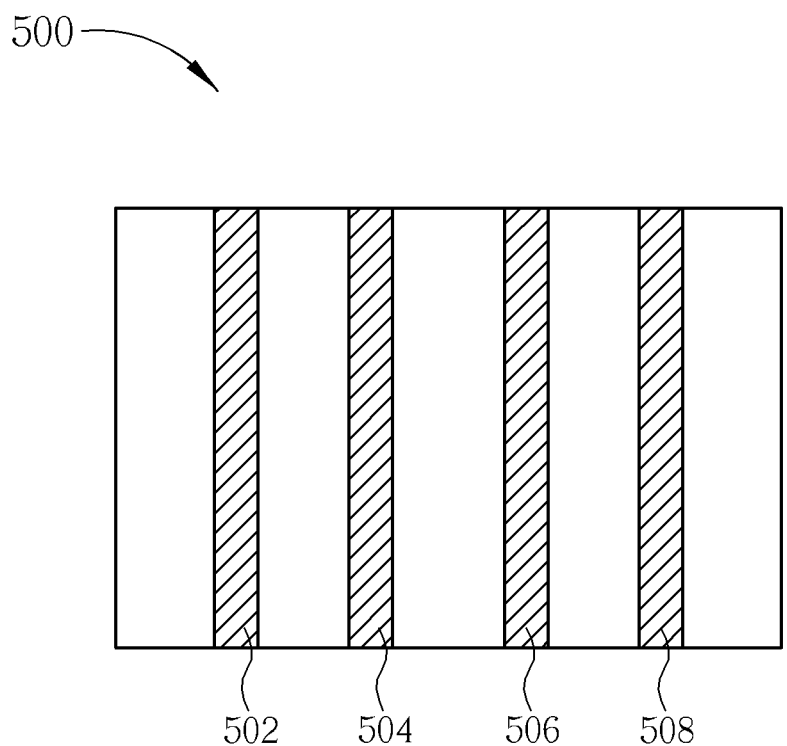
FIG. 6B is a diagram showing an image captured by the image sensor of FIG. 5.
Figure 7:
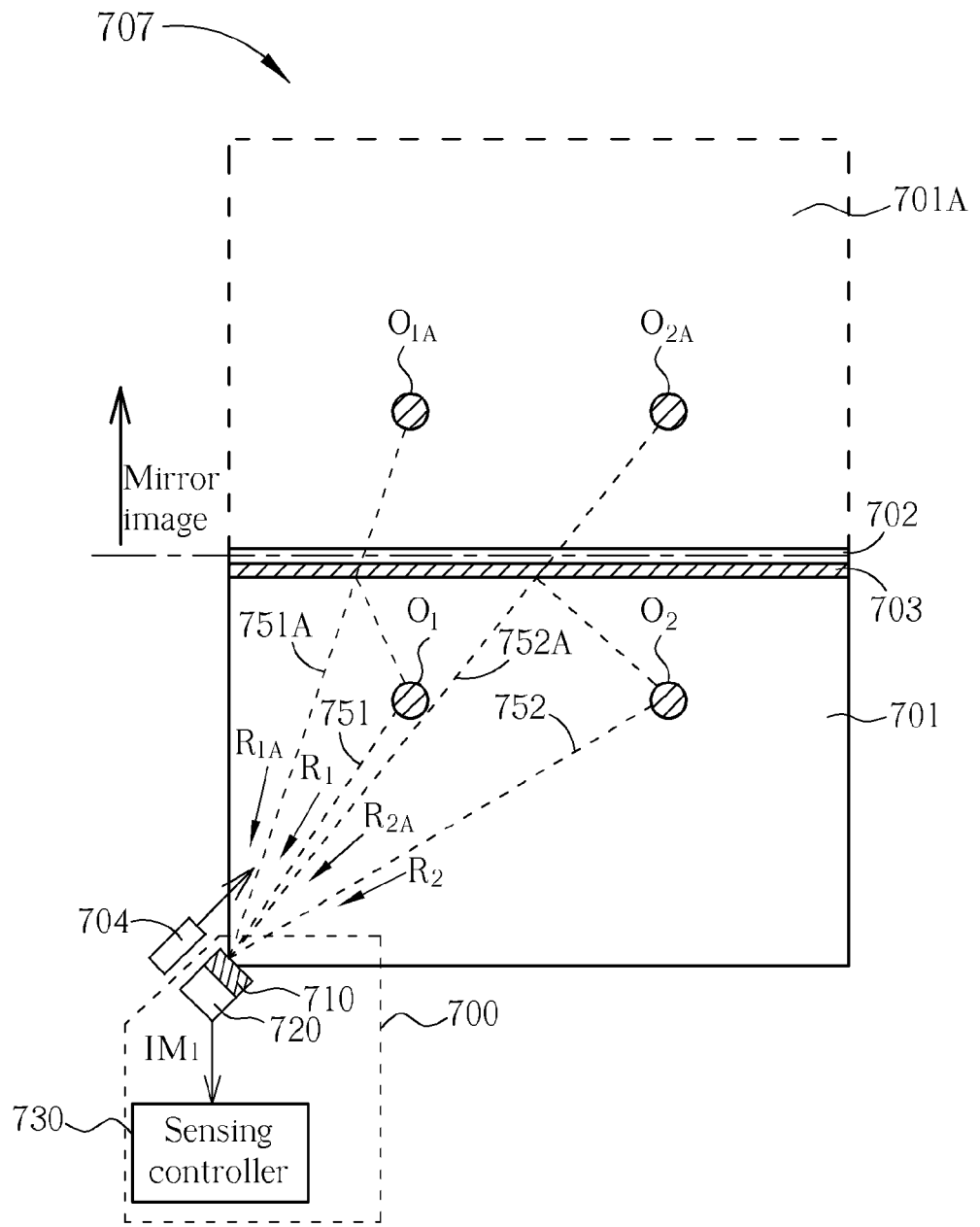
FIG. 7 is a diagram showing an embodiment of an image sensing module of the present invention.
Figure 8:
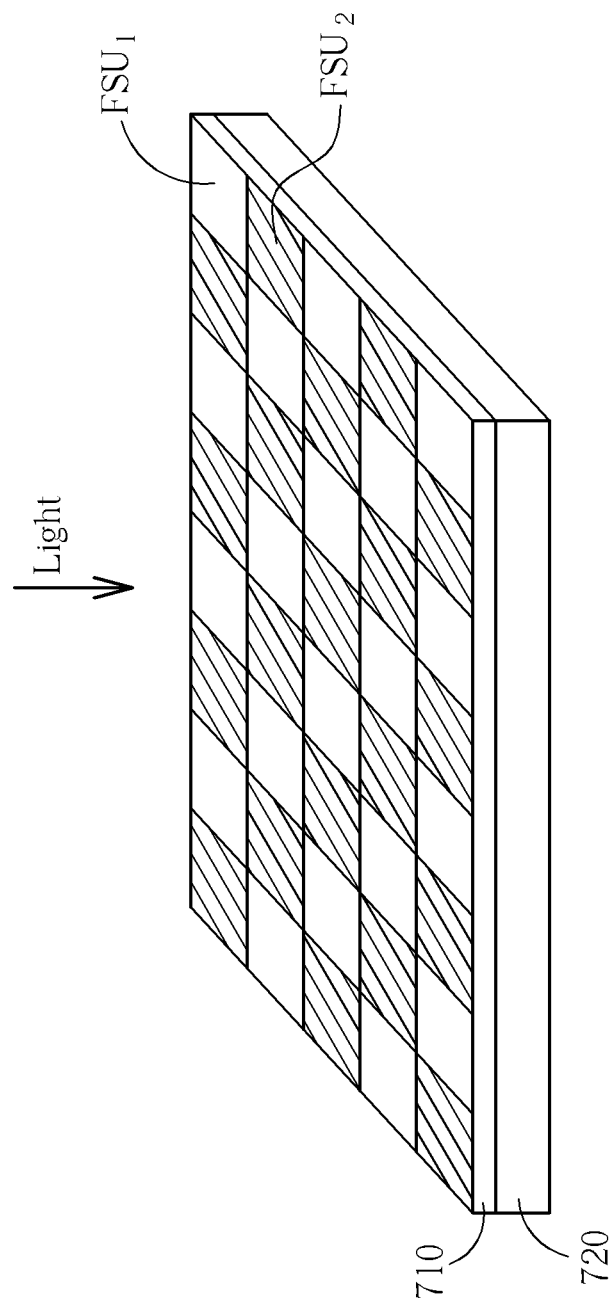
FIG. 8 is a diagram showing a first embodiment of a light filtering module of the image sensing module of the present invention.
Figure 9:
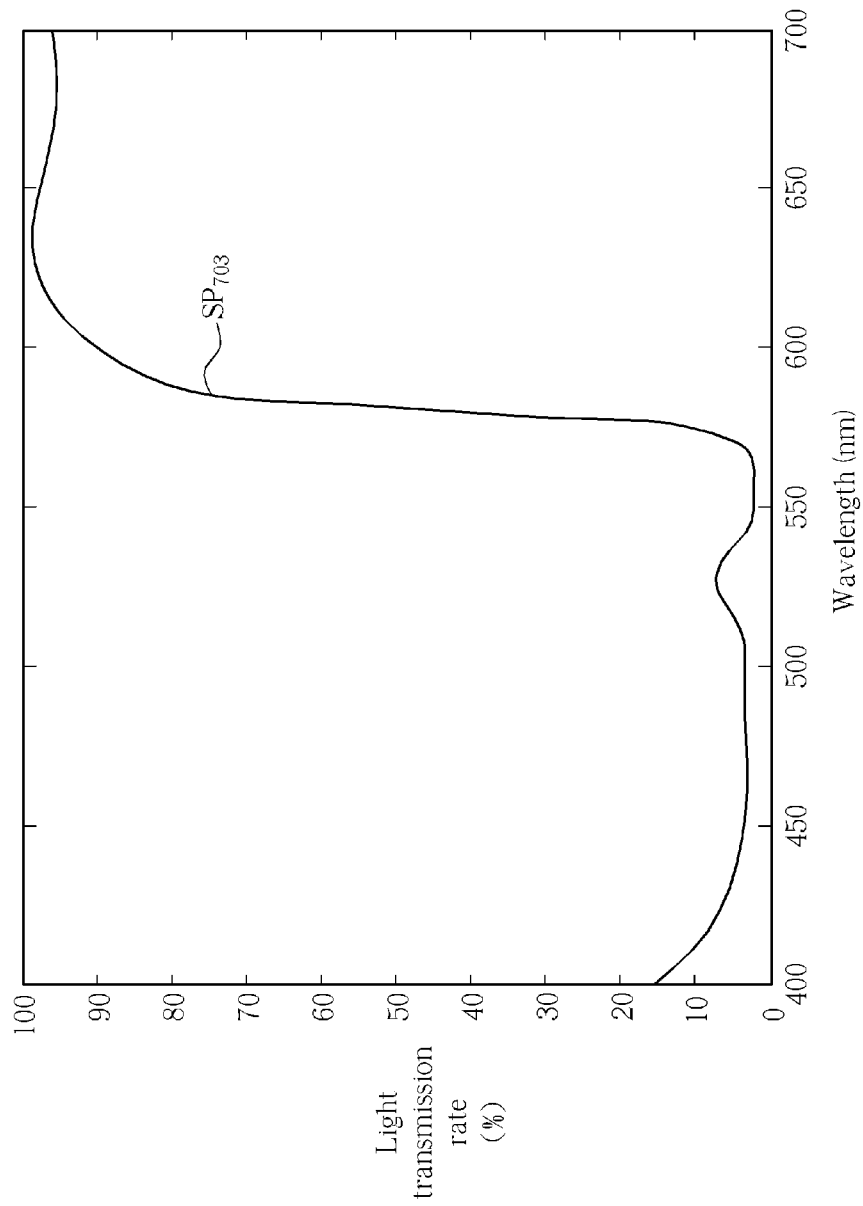
FIG. 9 is a diagram showing a transmission spectrum of the light filtering module arranged in front of the mirror of FIG. 7.
Figure 10:
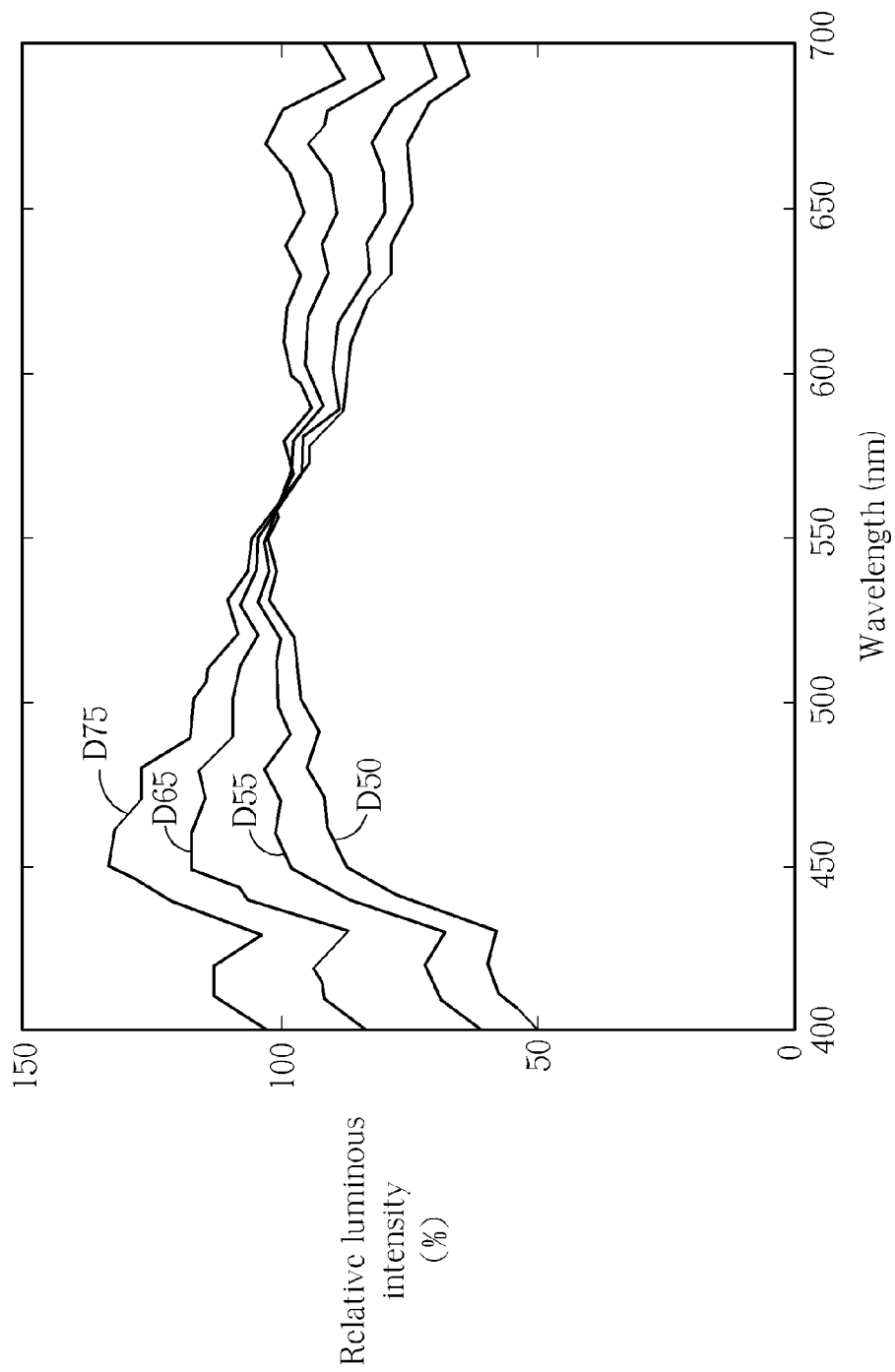
FIG. 10 is a diagram showing light spectrums of the light emitting element of FIG. 7.
Figure 11:
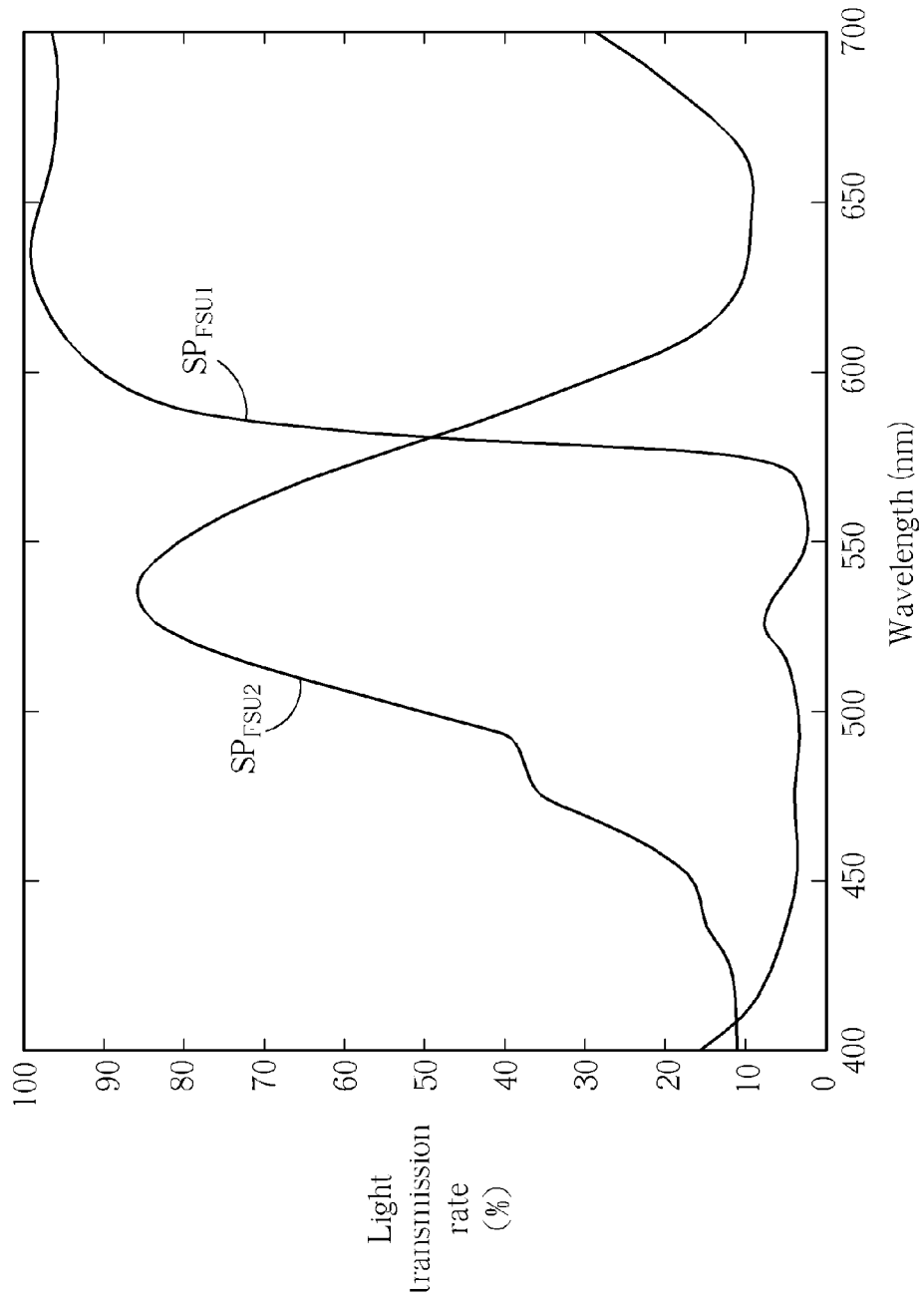
FIG. 11 is a diagram showing transmission spectrums of the light filtering components of the light filtering module of the image sensing module of the present invention.
Figure 12:
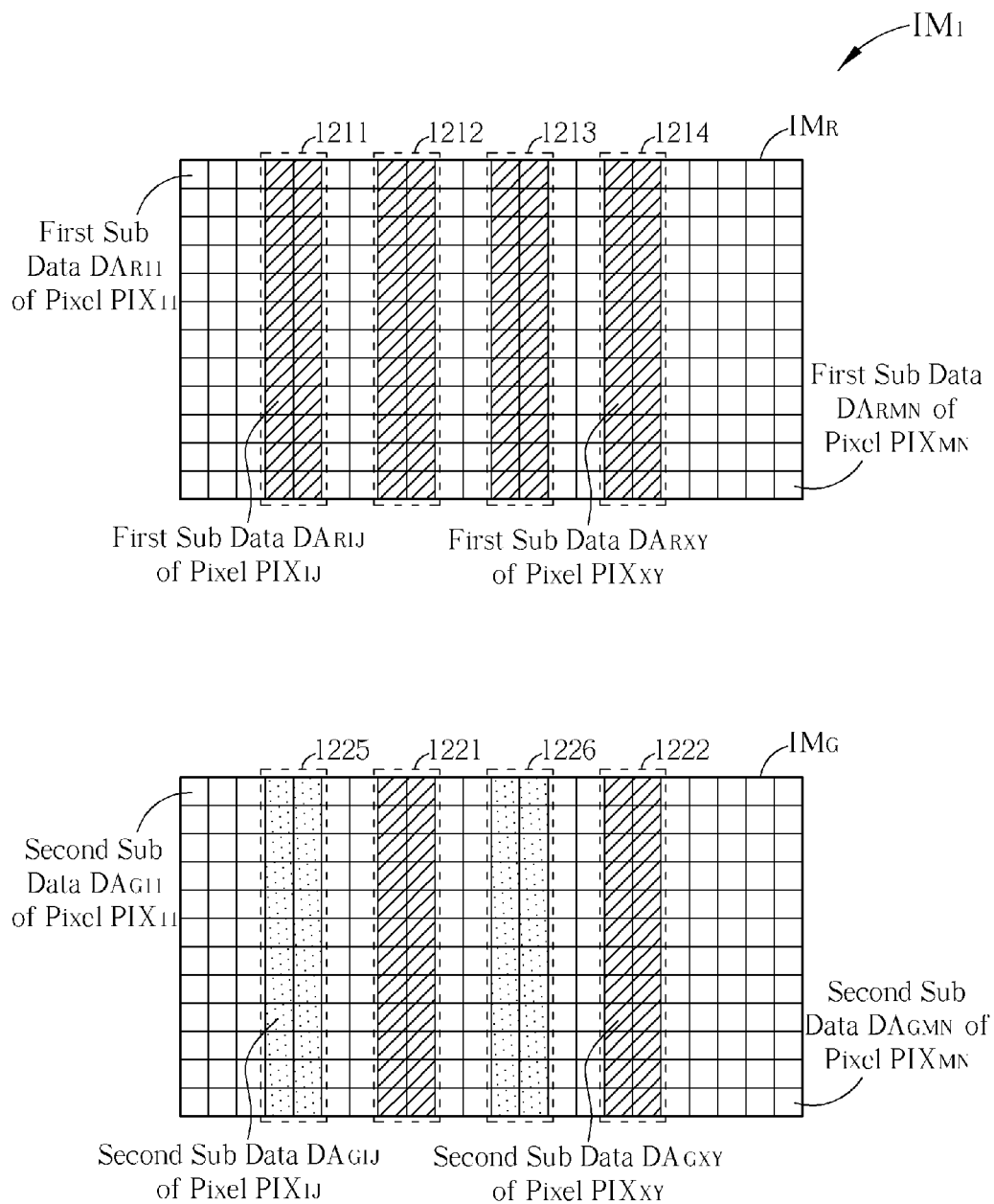
FIG. 12 is a diagram showing the image generated by the image sensor of FIG. 8.

Please refer to FIG. 7 and FIG. 8. FIG. 7 is a diagram showing an embodiment of an image sensing module 700 of the present invention. FIG. 8 is a diagram showing a first embodiment of a light filtering module of the image sensing module 700 of the present invention. The image sensing module 700 of FIG. 7 is assumed to be utilized in an optical sensing system 707. The optical sensing system 707 is for sensing a position of at least one object (such as $O_1$ and $O_2$). The optical sensing system 707 comprises a mirror 702, a light filtering module 703, a light emitting element 704, and a sensing area 701. The light filtering module 703 is arranged in front of the mirror 702 for filtering incoming light of the mirror 702. For facilitating illustration, the light filtering module 703 is assumed to be a red color filter with a transmission spectrum $SP_{703}$ shown in FIG. 9. The mirror 702 receives and reflects light via the light filtering module 703 for generating a mirror image 701A of the sensing area 701 and mirror images $O_{1A}$, $O_{2A}$ of the objects $O_1$, $O_2$. The light emitting element 704 is arranged nearby the image sensing module 700. The light emitting element 704 emits light to the sensing area 701. A light spectrum of the light emitting element 704 can be D50, D55, D65, or D75 as shown in FIG. 10. The image sensing module 700 comprises a light filtering module 710, an image sensor 720, and a sensing controller 730. The light filtering module 710 comprises at least a plurality of light filtering components $FSU_1$ and a plurality of light filtering components $FSU_2$. The light filtering components $FSU_1$ and the light filtering components $FSU_2$ are interlacedly arranged. In the present embodiment, the light filtering components $FSU_1$ are assumed to be red color filters with a transmission spectrum $SP_{FSU1}$ shown in FIG. 11. The transmission spectrum of the light filtering components $FSU_1$ is similar to the transmission spectrum of the light filtering module 703. The transmission spectrum of the light filtering components $FSU_2$ is different from the transmission spectrum of the light filtering components $FSU_1$. For example, the light filtering components $FSU_2$ can be blue or green color filters. In the present embodiment, the light filtering components $FSU_2$ are assumed to be green color filters with a transmission spectrum $SP_{FSU2}$ shown in FIG. 11. In FIG. 7, the image sensor 720 generates an image $IM_1$ by receiving real images of the objects $O_1$, $O_2$ and mirror images of the objects $O_{1A}$, $O_{2A}$ reflected from the mirror 702. FIG. 12 is a diagram showing the image $IM_1$. As shown in FIG. 12, the image $IM_1$ comprises pixels $PIX_{11}$~$PIX_{MN}$, and each pixel comprises a first sub data $DA_R$ generated by the image sensor 720 corresponding to light transmitted through at least a light filtering component $FSU_1$, and a second sub data $DA_G$ generated by the image sensor 720 corresponding to light transmitted through at least a light filtering component $FSU_2$. For example, the pixel $PIX_{11}$ comprises a first sub data $DA_{R11}$ generated by the image sensor 720 corresponding to light transmitted through at least a light filtering component $FSU_1$, and a second sub data $DA_{G11}$ generated by the image sensor 720 corresponding to light transmitted through at least a light filtering component $FSU_2$. The pixel $PIX_{MN}$ comprises a first sub data $DA_{RMN}$ generated by the image sensor 720 corresponding to light transmitted through at least a light filtering component $FSU_1$, and a second sub data $DA_{GMN}$ generated by the image sensor 720 corresponding to light transmitted through at least a light filtering component $FSU_2$. The sensing controller 730 is electrically connected to the image sensor 720 for receiving the image $IM_1$. The sensing controller 730 determines real images of the objects $O_1$, $O_2$ and mirror images of the objects $O_{1A}/O_{2A}$ from the image $IM_1$ according to the first sub data $DA_{R11}$~$DA_{RMN}$ and the second sub data $DA_{G11}$~$DA_{GMN}$ of the pixels $PIX_{11}$~$PIX_{MN}$. The operation principle of the image sensing module 700 is illustrated below.

In FIG. 12, the image $IM_1$ is formed of a sub image $IM_R$ and a sub image $IM_G$, wherein the sub image $IM_R$ comprises the first sub data $DA_{R11}$~$DA_{RMN}$ of the pixels $PIX_{11}$~$PIX_{MN}$, and the sub image $IM_G$ comprises the second sub data $DA_{G11}$~$DA_{GMN}$ of the pixels $PIX_{11}$~$PIX_{MN}$. The sub images $IM_R$ and $IM_G$ are generated according to sensing signals generated by sensing units of the image sensor 720. For example, the image sensor 720 comprises (M×N)/2 first sensing units and (M×N)/2 second sensing units. The first sensing units and the second sensing units are interlacedly arranged. Each of the first sensing units generates a first sensing signal corresponding to light transmitted through the light filtering component $FSU_1$, such that the sub image $IM_R$ is generated according to the (M×N)/2 first sensing signals generated by the (M×N)/2 first sensing units. More particularly, by using interpolation, the first sub data $DA_{R11}$~$DA_{RMN}$ can be generated according to the (M×N)/2 first sensing signals generated by the (M×N)/2 first sensing units. Therefore, according to the above, each first sub data $DA_{R11}$~$DA_{RMN}$ is generated according to at least one first sensing signal. In other words, each first sub data $DA_{R11}$~$DA_{RMN}$ is generated by the image sensor 720 according to light transmitted through the light filtering component $FSU_1$. Similarly, in the image sensor 720, each of the second sensing units generates a second sensing signal corresponding to light transmitted through the light filtering component $FSU_2$, such that the sub image $IM_G$ is generated according to the (M×N)/2 second sensing signals generated by the (M×N)/2 second sensing units. More particularly, by using interpolation, the second sub data $DA_{G11}$~$DA_{GMN}$ can be generated according to the (M×N)/2 second sensing signals generated by the (M×N)/2 second sensing units. Therefore, each second sub data $DA_{G11}$~$DA_{GMN}$ is generated according to at least one second sensing signal. In other words, each second sub data $DA_{G11}$~$DA_{GMN}$ is generated by the image sensor 720 according to light transmitted through the light filtering component $FSU_2$. In the sub image $IM_R$, bright fringe areas 1211, 1212, 1213, 1214 correspond to real images of the objects or mirror images of the objects. More particularly, as shown in FIG. 7, after the light is emitted from the light emitting element 704, part of the light $R_1$ is emitted to the object $O_1$ and directly reflected back to the image sensor 720 along a light path 751 for generating a real image of the object $O_1$, part of the light $R_2$ is emitted to the object $O_2$ and directly reflected back to the image sensor 720 along a light path 752 for generating a real image of the object $O_2$, part of the light $R_{1A}$ is reflected back to the image sensor 720 through the object $O_1$, the light filtering module 703 and the mirror 702 along a light path 751A for generating a virtual image corresponding to the mirror image $O_{1A}$ of the object $O_1$, and part of the light $R_{2A}$ is reflected back to the image sensor 720 through the object $O_2$, the light filtering module 703 and the mirror 702 along a light path 752A for generating a virtual image corresponding to the mirror image $O_{2A}$ of the object $O_2$, such that the image sensor 720 senses the light $R_1$, $R_2$, $R_{1A}$, $R_{2A}$ for generating the sub images $IM_R$ and $IM_G$. The light $R_1$, $R_2$, $R_{1A}$, $R_{2A}$ forms the bright fringe areas 1211, 1212, 1213, 1214, 1221, 1222, 1225, 1226 in the sub images $IM_R$ and $IM_G$.

Figure 13:
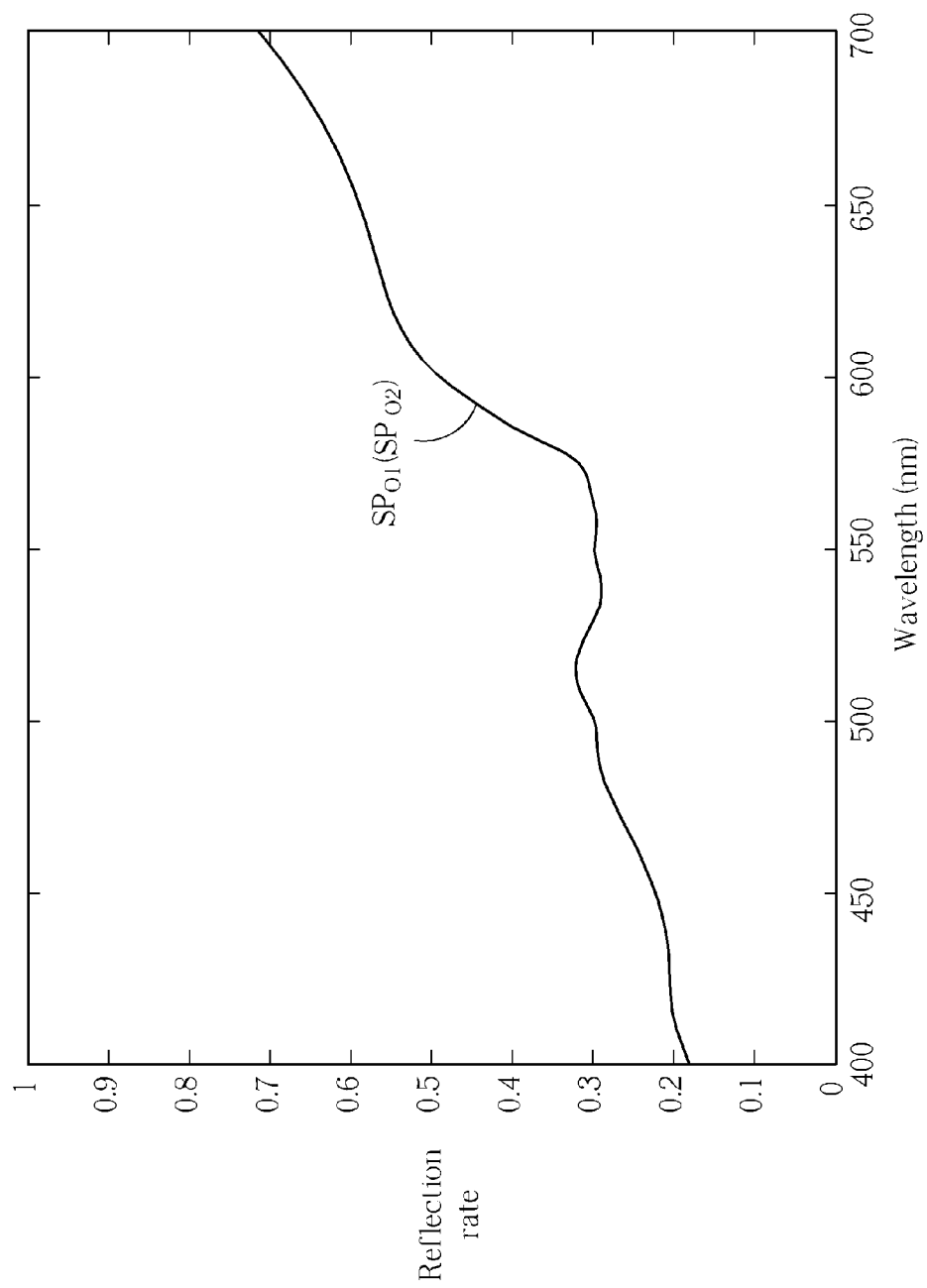
FIG. 13 is a diagram showing a reflection spectrum of the object.
Figure 14:
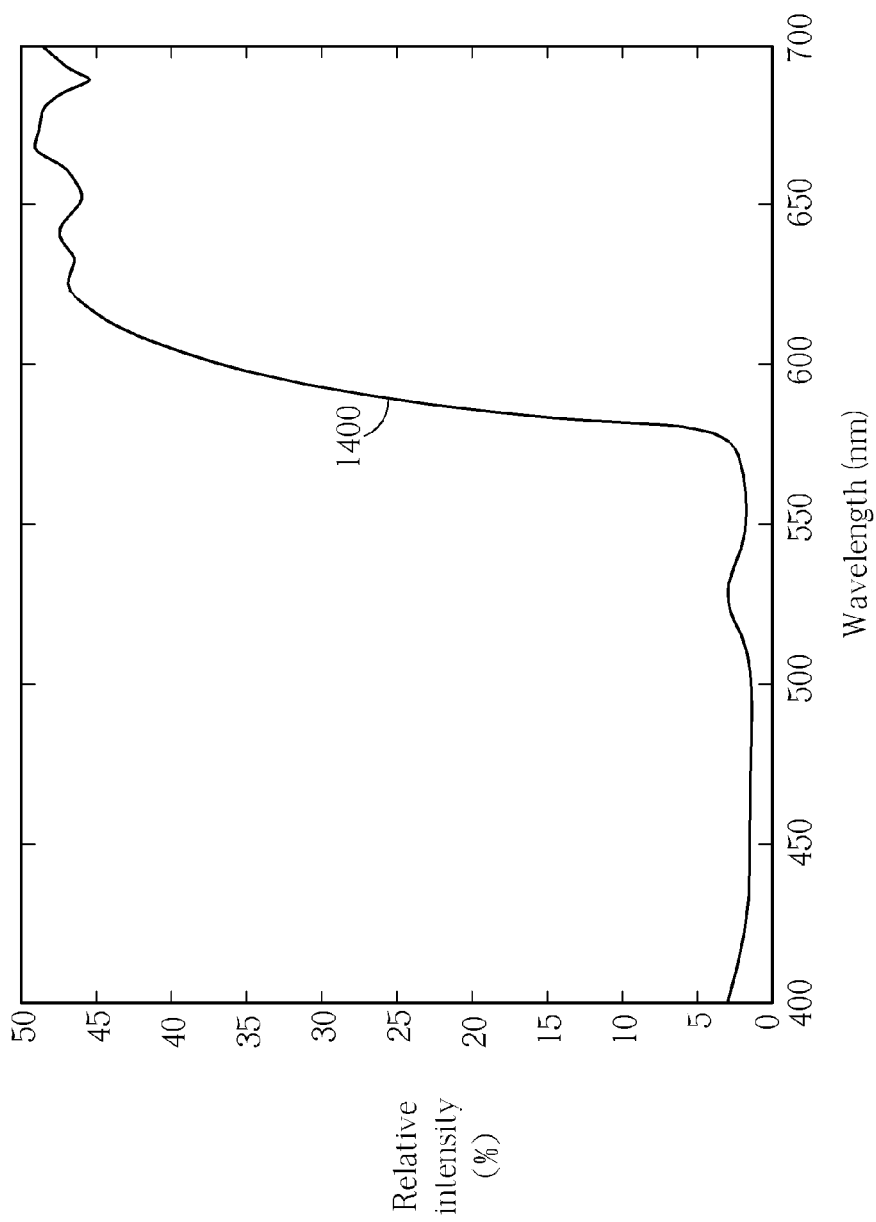
FIG. 14 is a diagram showing a spectral response of the image sensor when sensing light corresponding to a real image through the first light filtering component.
Figure 15:
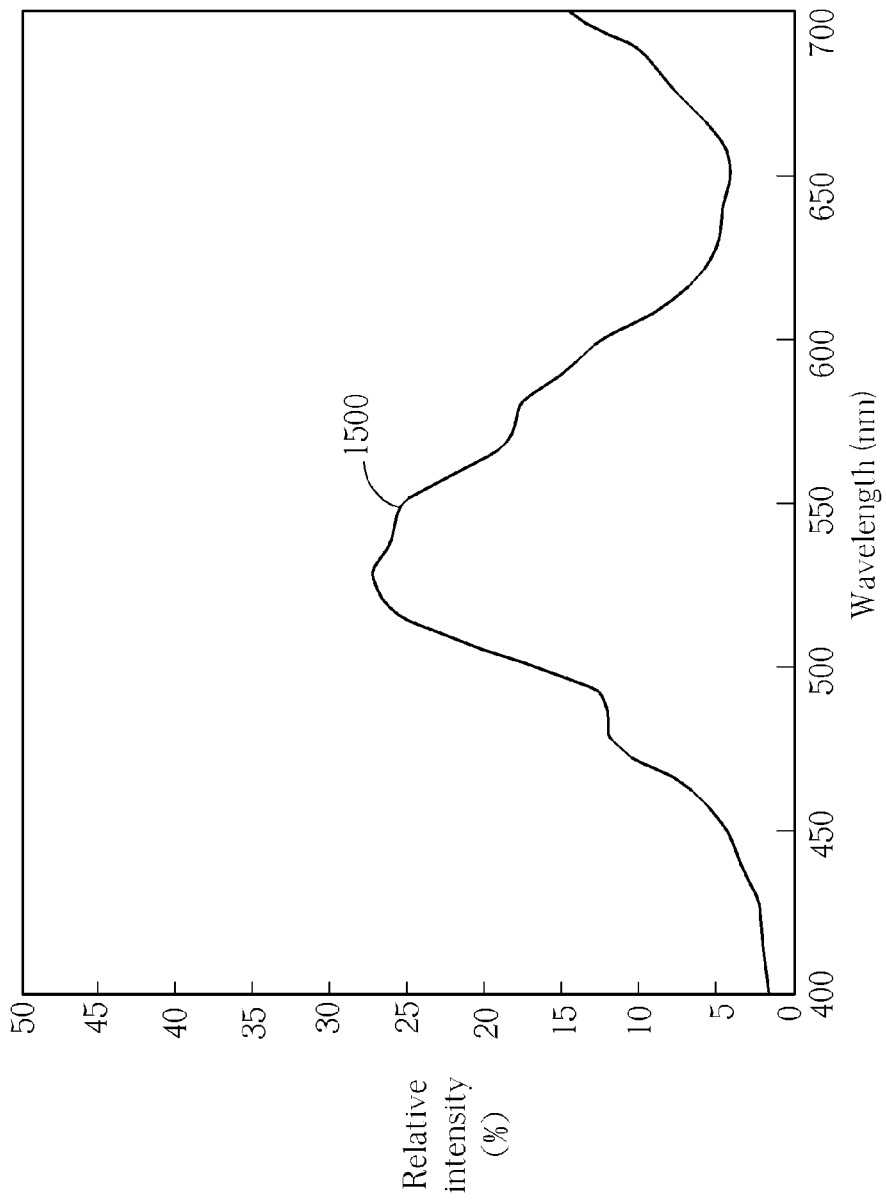
FIG. 15 is a diagram showing a spectral response of the image sensor when sensing light corresponding to a real image through the second light filtering component.

In FIG. 7, the light $R_1$ is emitted to the object $O_1$ and directly reflected back to the image sensor 720 along a light path 751 for generating the real image of the object $O_1$. According to light spectrums of the light emitting element of FIG. 10, a reflection spectrum of the object, and the light spectrum $SP_{FSU1}$ of the light filtering components $FSU_1$, the image sensor 720 has a spectral response 1400 by sensing light $R_1$ through the light filtering component $FSU_1$ as shown in FIG. 14. According to the spectral response 1400, when the plurality of first sensing units of the image sensor 720 sense the light $R_1$, the plurality of first sensing units generate the first sensing signals with larger values, such that the first sub data $DA_R$ generated according to the first sensing signals have larger values, which form the bright fringe area in the sub image $IM_R$. In addition, according to light spectrum D65, reflection spectrum $SP_{O1}$ of the object $O_1$ and the light spectrum $SP_{FSU2}$ of the light filtering components $FSU_2$, the image sensor 720 has a spectral response 1500 by sensing light $R_1$ through the light filtering component $FSU_2$ as shown in FIG. 15. According to the spectral response 1500, when the plurality of second sensing units of the image sensor 720 sense the light $R_1$, the plurality of second sensing units generate the second sensing signals with larger values, such that the second sub data $DA_G$ generated according to the second sensing signals form the bright fringe areas in the sub image $IM_G$. Therefore, when the image sensor 720 senses the light $R_1$, the light $R_1$ forms bright fringe areas both in the sub images $IM_R$ and $IM_G$. Similarly, the light $R_2$ is emitted to the object $O_2$ and directly reflected back to the image sensor 720 along a light path 752 for generating the real image of the object $O_2$. According to light spectrum D65 of the light emitting element of FIG. 10, the reflection spectrum $SP_{O2}$ of the object $O_2$ of FIG. 13, and the light spectrum $SP_{FSU1}$ of the light filtering components $FSU_1$, the image sensor 720 has the same spectral response 1400 by sensing light $R_2$ through the light filtering component $FSU_1$ as shown in FIG. 14. And according to light spectrum D65, reflection spectrum $SP_{O2}$ of the object $O_2$ and the light spectrum $SP_{FSU2}$ of the light filtering components $FSU_2$, the image sensor 720 has the same spectral response 1500 by sensing light $R_2$ through the light filtering component $FSU_2$ as shown in FIG. 15. Therefore, when the image sensor 720 senses the light $R_2$, the light $R_2$ forms bright fringe areas both in the sub images $IM_R$ and $IM_G$.

Figure 16:
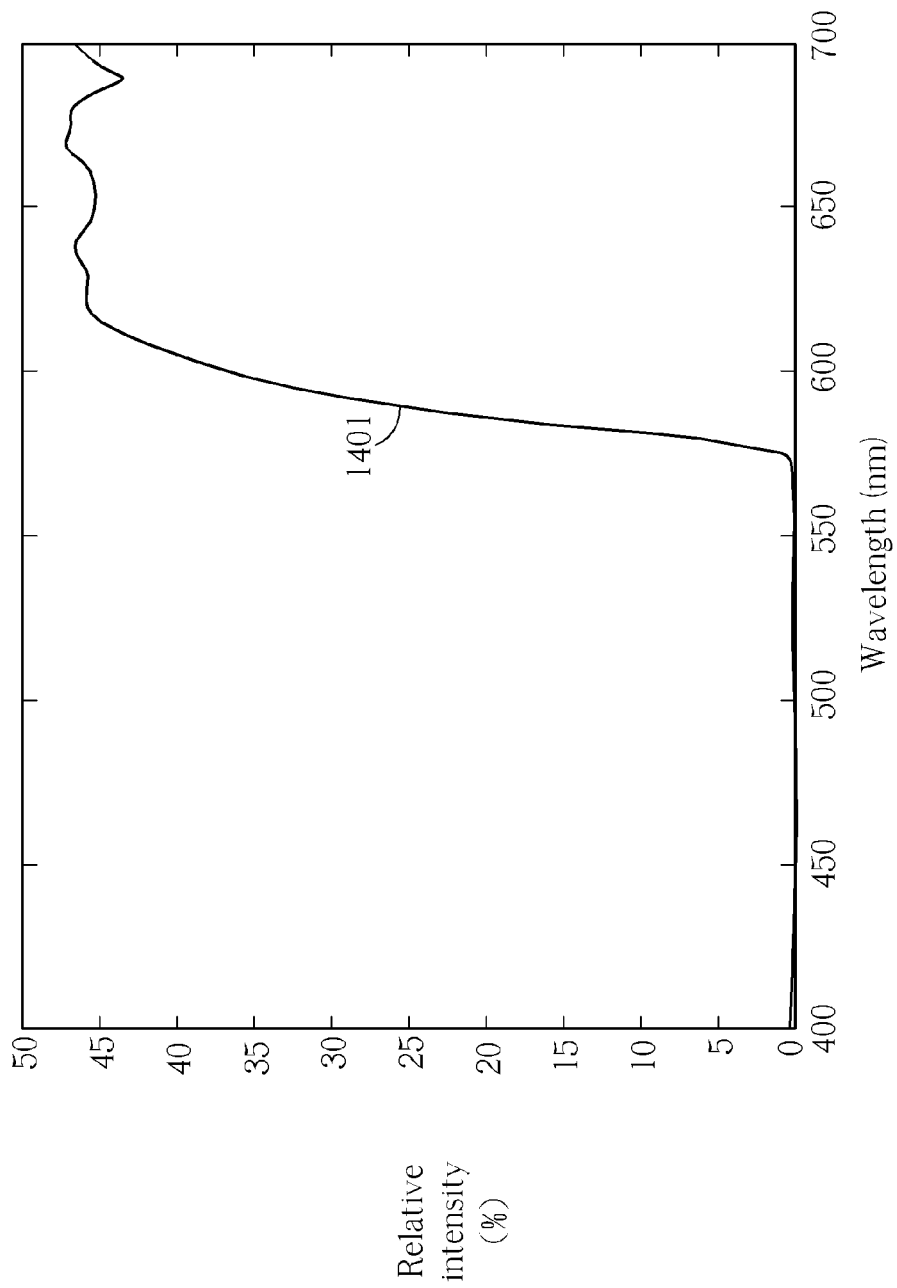
FIG. 16 is a diagram showing a spectral response of the image sensor when sensing light corresponding to a virtual image through the first light filtering component.
Figure 17:
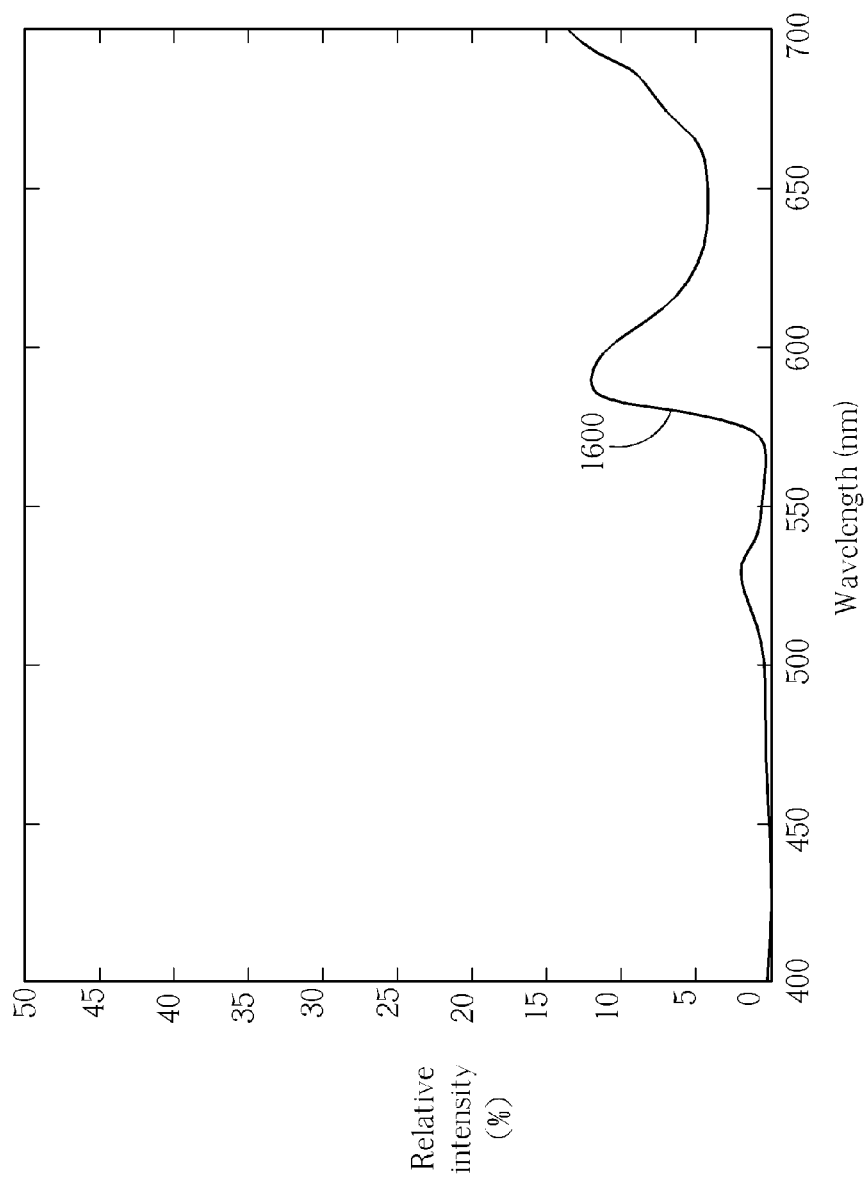
FIG. 17 is a diagram showing a spectral response of the image sensor when sensing light corresponding to a virtual image through the second light filtering component.

In addition, in FIG. 7, the light $R_{1A}$ is reflected back to the image sensor 720 through the object $O_1$, the light filtering module 703 and the mirror 702 along a light path 751A for generating a virtual image corresponding to the mirror image $O_{1A}$ of the object $O_1$. According to light spectrum D65 of the light emitting element of FIG. 10, the reflection spectrum $SP_{O1}$ of the object $O_1$, the transmission spectrum $SP_{703}$ of the light filtering module 703, and the light spectrum $SP_{FSU1}$ of the light filtering components $FSU_1$, the image sensor 720 has a spectral response 1401 by sensing light $R_{1A}$ through the light filtering component $FSU_1$ as shown in FIG. 16. According to the spectral response 1401, when the image sensor 702 senses the light $R_{1A}$, the light $R_{1A}$ forms bright fringe areas in the sub images $IM_R$. In addition, according to light spectrum D65, reflection spectrum $SP_{O1}$ of the object $O_1$, the transmission spectrum $SP_{703}$ of the light filtering module 703, and the light spectrum $SP_{FSU2}$ of the light filtering components $FSU_2$, the image sensor 720 has a spectral response 1600 by sensing light $R_{1A}$ through the light filtering component $FSU_2$ as shown in FIG. 17. According to the spectral response 1600, when the plurality of second sensing units of the image sensor 720 sense the light $R_{1A}$, the plurality of second sensing units generate the second sensing signals with smaller values, such that the second sub data $DA_G$ generated according to the second sensing signals have smaller values. Therefore, the light $R_{1A}$ forms the bright fringe area 1225 darker than the bright fringe area 1211 in the sub image $IM_G$. Similarly, the light $R_{2A}$ is reflected back to the image sensor 720 through the object $O_2$, the light filtering module 703 and the mirror 702 along a light path 752A for generating a virtual image corresponding to the mirror image $O_{2A}$ of the object $O_2$. According to light spectrum D65, the reflection spectrum $SP_{O2}$ of the object $O_2$, the transmission spectrum $SP_{703}$ of the light filtering module 703, and the light spectrum $SP_{FSU1}$ of the light filtering components $FSU_1$, the image sensor 720 has the same spectral response 1401 by sensing light $R_{2A}$ through the light filtering component $FSU_1$. Therefore, the light $R_{2A}$ forms bright fringe areas in the sub image $IM_R$. In addition, according to light spectrum D65, reflection spectrum $SP_{O2}$ of the object $O_2$, the transmission spectrum $SP_{703}$ of the light filtering module 703, and the light spectrum $SP_{FSU2}$ of the light filtering components $FSU_2$, the image sensor 720 has the same spectral response 1600 by sensing light $R_2$ through the light filtering component $FSU_2$. Therefore, the light $R_{2A}$ forms the bright fringe area 1213 darker than the bright fringe area 1226 in the sub images $IM_G$.

As shown in FIG. 12, the second sub data $DA_G$ of the pixels inside the bright fringe areas 1221 and 1222 has larger value, therefore a result of subtracting the second sub data $DA_G$ from the first sub data $DA_R$ of the pixels inside the bright fringe areas 1221 and 1222 is smaller. In contrast, the second sub data $DA_G$ of the pixels inside the darker bright fringe areas 1225 and 1226 has smaller value, therefore a result of subtracting the second sub data $DA_G$ from the first sub data $DA_R$ of the pixels inside the bright fringe areas 1225 and 1226 is larger. In other words, the sensing controller 730 can set a first virtual image threshold value to be compared with the result of subtracting the second sub data $DA_G$ from the first sub data $DA_R$ of each pixel in order to determine whether an image displayed on the pixel belongs to the real image or the virtual image. When a result of subtracting a second sub data (such as $DA_{GIJ}$) from the first sub data (such as $DA_{RIJ}$) of a pixel (such as $PIX_{IJ}$) in the image area is greater than the first virtual image threshold value, the sensing controller 730 determines the image displayed on the pixel $PIX_{IJ}$ is the virtual image. When a result of subtracting a second sub data (such as $DA_{GXY}$) from the first sub data (such as $DA_{RXY}$) of a pixel (such as $PIX_{XY}$) in the image area is smaller than the first virtual image threshold value, the sensing controller 730 determines the image displayed on the pixel PIX is the real image.

Figure 18:
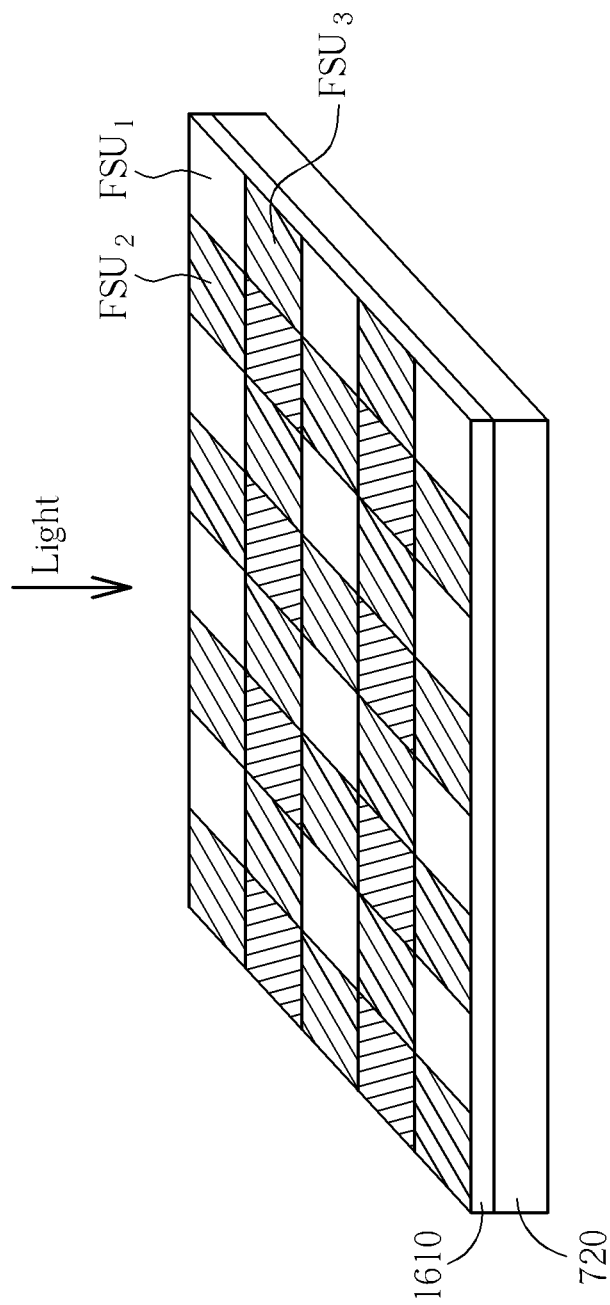
FIG. 18 is a diagram showing a second embodiment of the light filtering module of the image sensing module of the present invention.
Figure 19:
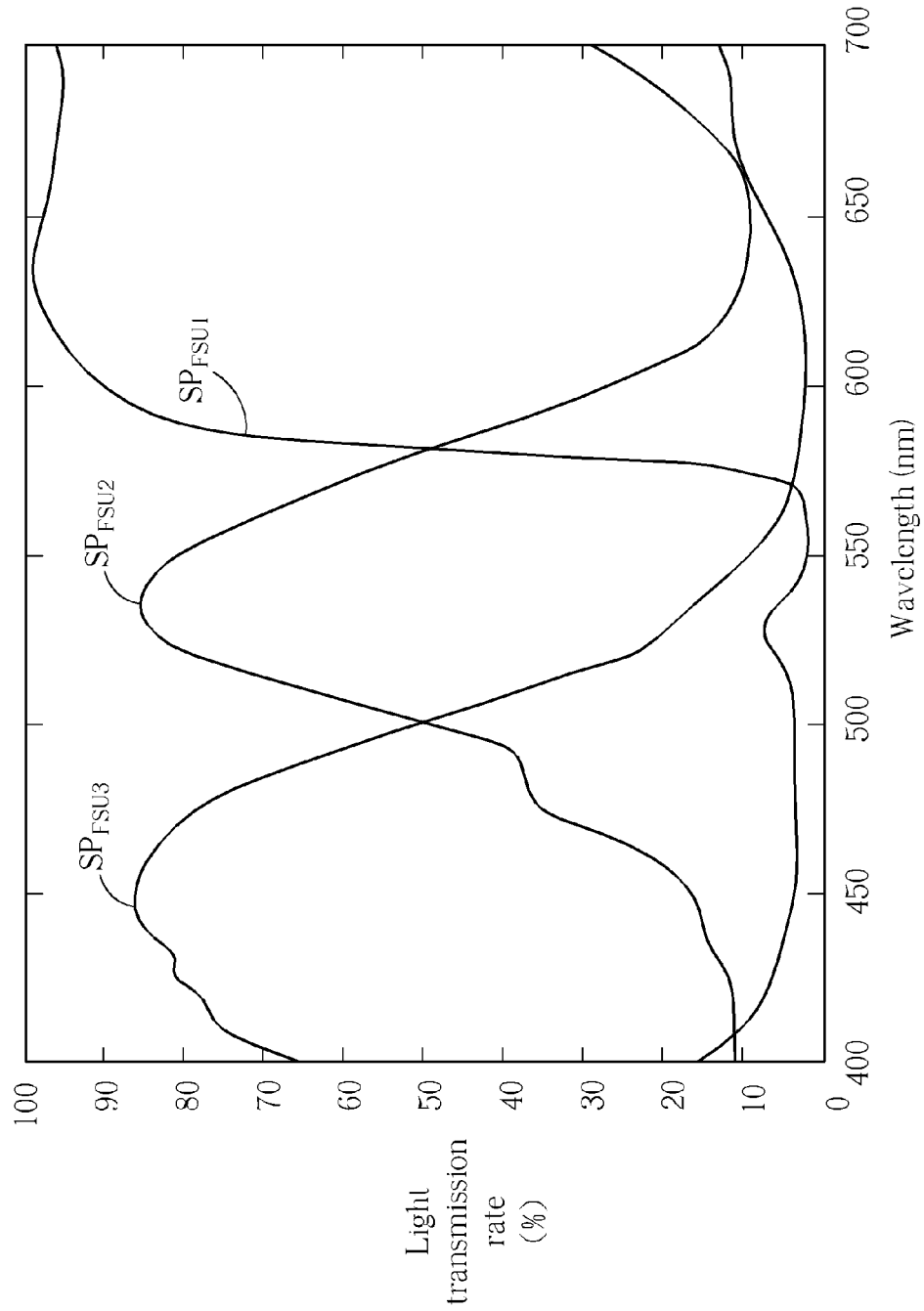
FIG. 19 is a diagram showing a transmission spectrum of the light filtering components of the light filtering module of the image sensing module of FIG. 18.
Figure 20:
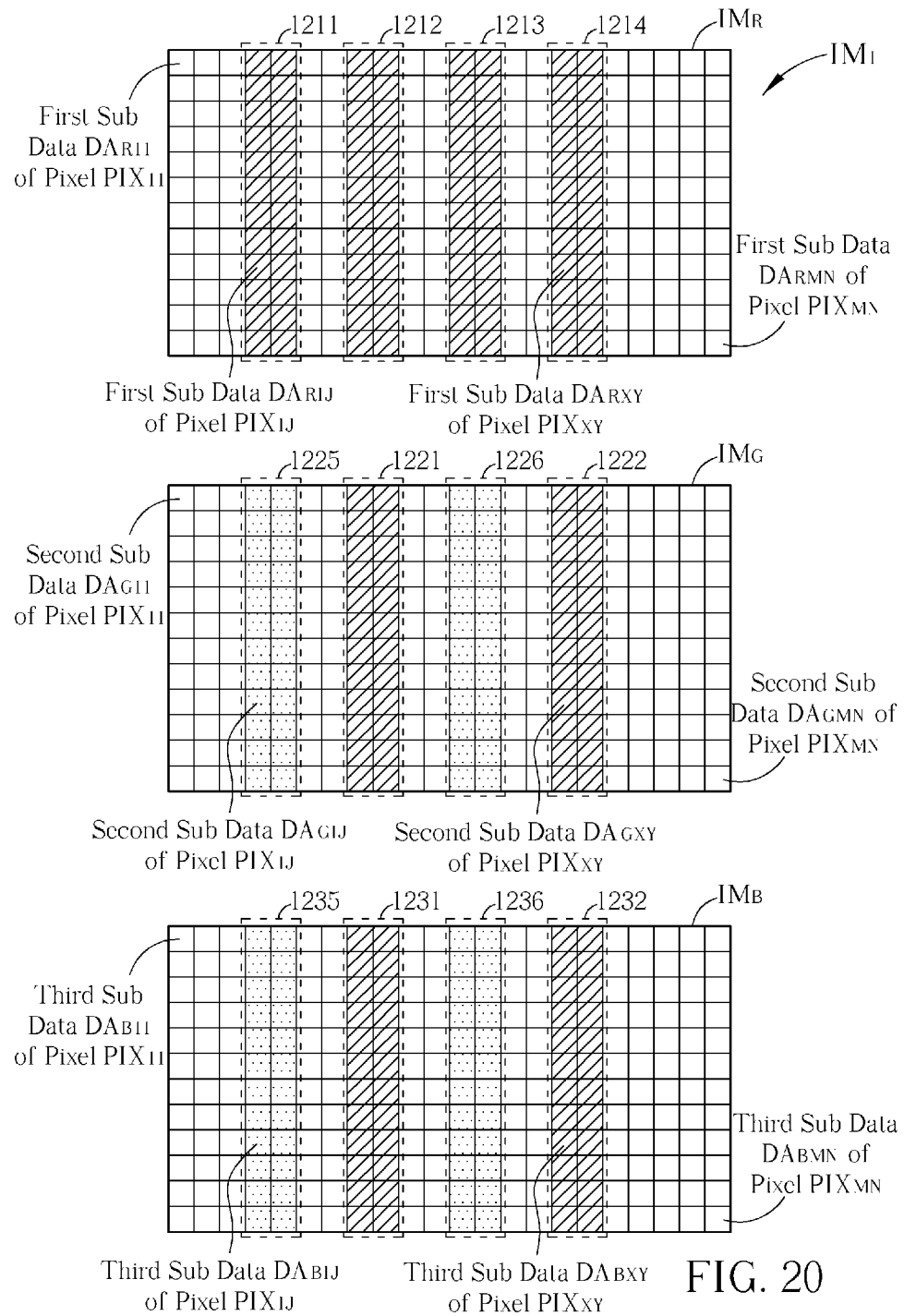
FIG. 20 is a diagram showing the image generated by the image sensor of FIG. 18.

Please refer to FIG. 18. FIG. 18 is a diagram showing another embodiment of the light filtering module 1610 arranged on the image sensor 720 of the present invention. In contrast to the light filtering module 710, the light filtering module 1610 further comprises a plurality of light filtering components $FSU_3$. In the light filtering module 1610, the plurality of light filtering components $FSU_1$, the plurality of light filtering components $FSU_2$, and the plurality of light filtering components $FSU_3$ are interlacedly arranged. In the present embodiment, the light filtering components $FSU_3$ are assumed to be blue color filters with a transmission spectrum $SP_{FSU3}$ shown in FIG. 19. As shown in FIG. 20, the image $IM_1$ is formed of sub images $IM_R$, $IM_G$, $IM_B$. The sub image $IM_B$ comprises third sub data $DA_{R11}$~$DA_{RMN}$ of the pixels $PIX_{11}$~$PIX_{MN}$. That is, besides the first sub data $DA_{R11}$~$DA_{RMN}$ and the second sub data $DA_{G11}$~$DA_{GMN}$, the pixels $PIX_{11}$~$PIX_{MN}$ further comprise the third sub data $DA_{R11}$~$DA_{RMN}$. The third sub data $DA_{R11}$~$DA_{RMN}$ of the sub image $IM_B$ are generated by the image sensor 720 corresponding to light transmitted through the light filtering component $FSU_3$. The sensing controller 730 determines real images of the objects $O_1$, $O_2$ and mirror images of the objects $O_{1A}$, $O_{2A}$ from the image $IM_1$ according to the first sub data $DA_{R11}$~$DA_{RMN}$, the second sub data $DA_{G11}$~$DA_{GMN}$, and the third sub data $DA_{R11}$~$DA_{RMN}$ of the pixels $PIX_{11}$~$PIX_{MN}$. For example, when the sensing controller 730 determines the image area, the sensing controller 730 determines whether an image displayed on a pixel inside the image area belongs to the real image or the virtual image according to the first sub data $DA_R$, the second sub data $DA_G$, and the third sub data $DA_B$ of the pixel. More particularly, in the present embodiment, the light $R_{1A}$ and $R_{2A}$ is parts of light not belonging to red light filtered out by the light filtering module 703. The light $R_1$ and $R_2$, which does not pass through the light filtering module 703, may still have some part not belonging to red light. Therefore, the third sub data generated by the image sensor 720 by receiving light $R_{1A}$ and $R_{2A}$ through the light filtering components $FSU_3$ has smaller value, and the third sub data generated by the image sensor 720 by receiving light $R_1$ and $R_2$ through the light filtering components $FSU_3$ has larger value. According to the above, the bright fringes 1231 and 1232 with higher brightness are formed by the light $R_1$ and $R_2$, and the bright fringes 1235 and 1236 with lower brightness are formed by the light $R_{1A}$ and $R_{2A}$. The sensing controller 730 can predetermine a third sub data threshold value. When the second sub data $DA_G$ of a pixel in the image area is greater than a second sub data threshold value, and the third sub data $DA_B$ of the pixel is also greater than the third sub data threshold value, the sensing controller 730 determines an image displayed on the pixel is the real image. When the second sub data $DA_G$ of a pixel in the image area is smaller than the second sub data threshold value and the third sub data $DA_B$ of the pixel is also smaller than the third sub data threshold value, the sensing controller 730 determines the image displayed on the pixel is the virtual image. In addition, since the third sub data generated by the image sensor 720 by receiving light $R_{1A}$ and $R_{2A}$ through the light filtering components $FSU_3$ has smaller value, and the third sub data generated by the image sensor 720 by receiving light $R_1$ and $R_2$ through the light filtering components $FSU_3$ has larger value, when a third sub data $DA_B$ of a pixel is generated according to the light $R_{1A}$ and $R_{2A}$, a result of subtracting the third sub data $DA_B$ from the first sub data $DA_R$ of the pixel has larger value. When a third sub data $DA_B$ of a pixel is generated according to the light $R_1$ and $R_2$, a result of subtracting the third sub data $DA_B$ from the first sub data $DA_R$ of the pixel has smaller value. Therefore, the sensing controller 730 can predetermine a second virtual image threshold value. When a result of subtracting a second sub data $DA_G$ from a first sub data $DA_R$ of a pixel in the image area is greater than the first virtual image threshold value, and a result of subtracting a third sub data $DA_B$ from the first sub data $DA_R$ of the pixel is greater than the second virtual image threshold value, the sensing controller 730 determines an image displayed on the pixel is the virtual image. When a result of subtracting a second sub data $DA_G$ from a first sub data $DA_R$ of a pixel in the image area is smaller than the first virtual image threshold value, and a result of subtracting a third sub data $DA_B$ from the first sub data $DA_R$ of the pixel is smaller than the second virtual image threshold value, the sensing controller 730 determines an image displayed on the pixel is the real image.

Figure 21:
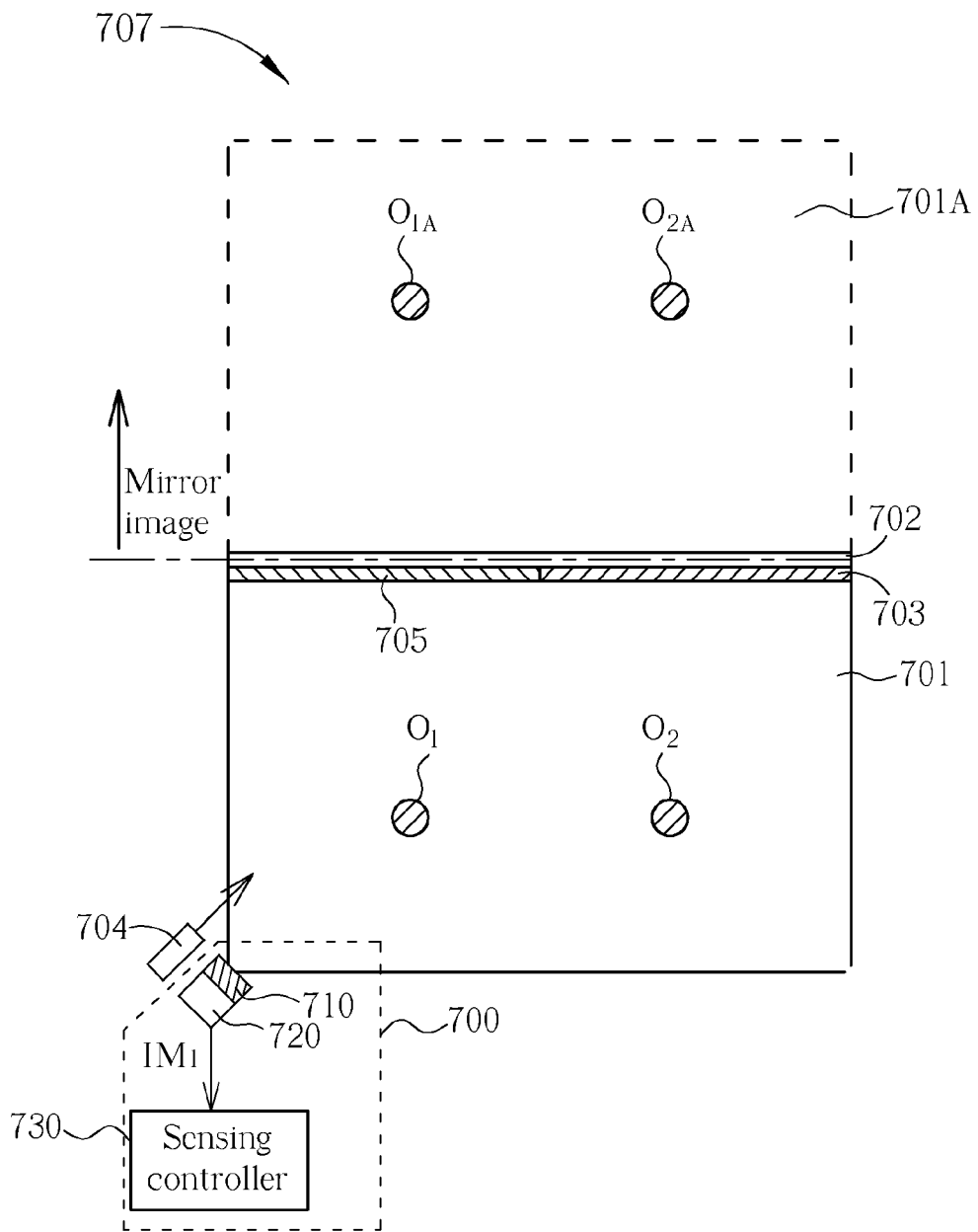
FIG. 21 is a diagram showing a plurality of light filtering modules installed in front of the mirror.

Furthermore, in the present invention, number of light filtering modules arranged in front of the mirror 702 is not limited to one. For example, please refer to FIG. 21. In addition to the light filtering module 703, another light filtering module 705 can be installed in front of the mirror 702. The light filtering module 705 can have a transmission spectrum (such as $SP_{FSU3}$) different from the transmission spectrums $SP_{FSU1}$, $SP_{FSU1}$, $SP_{FSU1}$, $SP_{703}$. More particularly, the mirror 702 can be divided into a first area and a second area. The light filtering module 703 is installed in front of the first area of the mirror 702, and the first area of the mirror 702 receives and reflects light through the light filtering module 703. The light filtering module 705 is installed in front of the second area of the mirror 702, and the second area of the mirror 702 receives and reflects light through the light filtering module 705.

In addition, the image sensing module of the present invention can be implemented in an optical sensing system. Please refer to FIG. 22 and FIG. 23, which are diagrams showing a first embodiment of an optical sensing system 2100 of the present invention. The optical sensing system 2100 is for detecting positions of the objects $O_1$, $O_2$. The optical sensing system 2100 comprises a sensing area 610, a light filtering module 703, a mirror 620, light emitting elements 704 and 706, image sensing modules 630 and 640, and a processing circuit 650. The structure of the mirror 620 is similar to the structure of the mirror 702. The mirror 620 receives and reflects light via the light filtering module 703 for generating a mirror image 610A of the sensing area 610. The mirror 620 also generates mirror images $O_{1A}$, $O_{2A}$ of the objects $O_1$, $O_2$, and mirror images 630A, 640A of the image sensing modules 630, 640. The light emitting element 704 is arranged nearby the image sensing module 630. The light emitting element 704 emits light to the sensing area 610. The light emitting element 706 is similar to the light emitting element 704. The light emitting element 706 is arranged nearby the image sensing module 640. The light emitting element 706 also emits light to the sensing area 610. The image sensing module 630 comprises a light filtering module 631, a image sensor 632, and a sensing controller 633. The light filtering module 631, the image sensor 632, and the sensing controller 633 are similar to the light filtering module 710, the image sensor 720, and the sensing controller 730, respectively. The light filtering module 631 comprises a plurality of light filtering components $FSU_1$ and a plurality of light filtering components $FSU_2$. The image sensor 632 generates an image $IM_1$ by receiving real images of the objects $O_1$, $O_2$ and mirror images of the objects $O_{1A}$, $O_{2A}$ reflected from the mirror 620. The sensing controller 633 determines real images of the objects $O_1$, $O_2$ and mirror images of the objects $O_{1A}$, $O_{2A}$ from the image $IM_1$ according to the first sub data $DA_{R11}$~$DA_{RMN}$ and the second sub data $DA_{G11}$~$DA_{GMN}$ of the image $IM_1$. The image sensing module 640 comprises a light filtering module 641, an image sensor 642, and a sensing controller 643. The light filtering module 641, the image sensor 642, and the sensing controller 643 are also similar to the light filtering module 710, the image sensor 720, and the sensing controller 730, respectively. The light filtering module 641 comprises a plurality of light filtering components $FSU_1$ and a plurality of light filtering components $FSU_2$. The image sensor 642 generates an image $IM_2$ by receiving real images of the objects $O_1$, $O_2$ and mirror images of the objects $O_{1A}$, $O_{2A}$ reflected from the mirror 620. The sensing controller 643 determines real images of the objects $O_1$, $O_2$ and mirror images of the objects $O_{1A}$, $O_{2A}$ from the image $IM_2$ according to the first sub data $DA_{R11}$~$DA_{RMN}$ and the second sub data $DA_{G11}$~$DA_{GMN}$ of the image $IM_2$. The processing circuit 650 generates a first set of candidate coordinates of the objects $O_1$, $O_2$ according to the real images and the virtual images captured by the image sensing module 630, and generates a second set of candidate coordinates of the objects $O_1$, $O_2$ according to the real images and the virtual images captured by the image sensing module 640. The processing circuit 650 compares the first set of candidate coordinates and the second set of candidate coordinates for generating output coordinates $S_{xy}$ of the objects $O_1$, $O_2$. The operation principle for generating the output coordinates is illustrated below.

Figure 22:
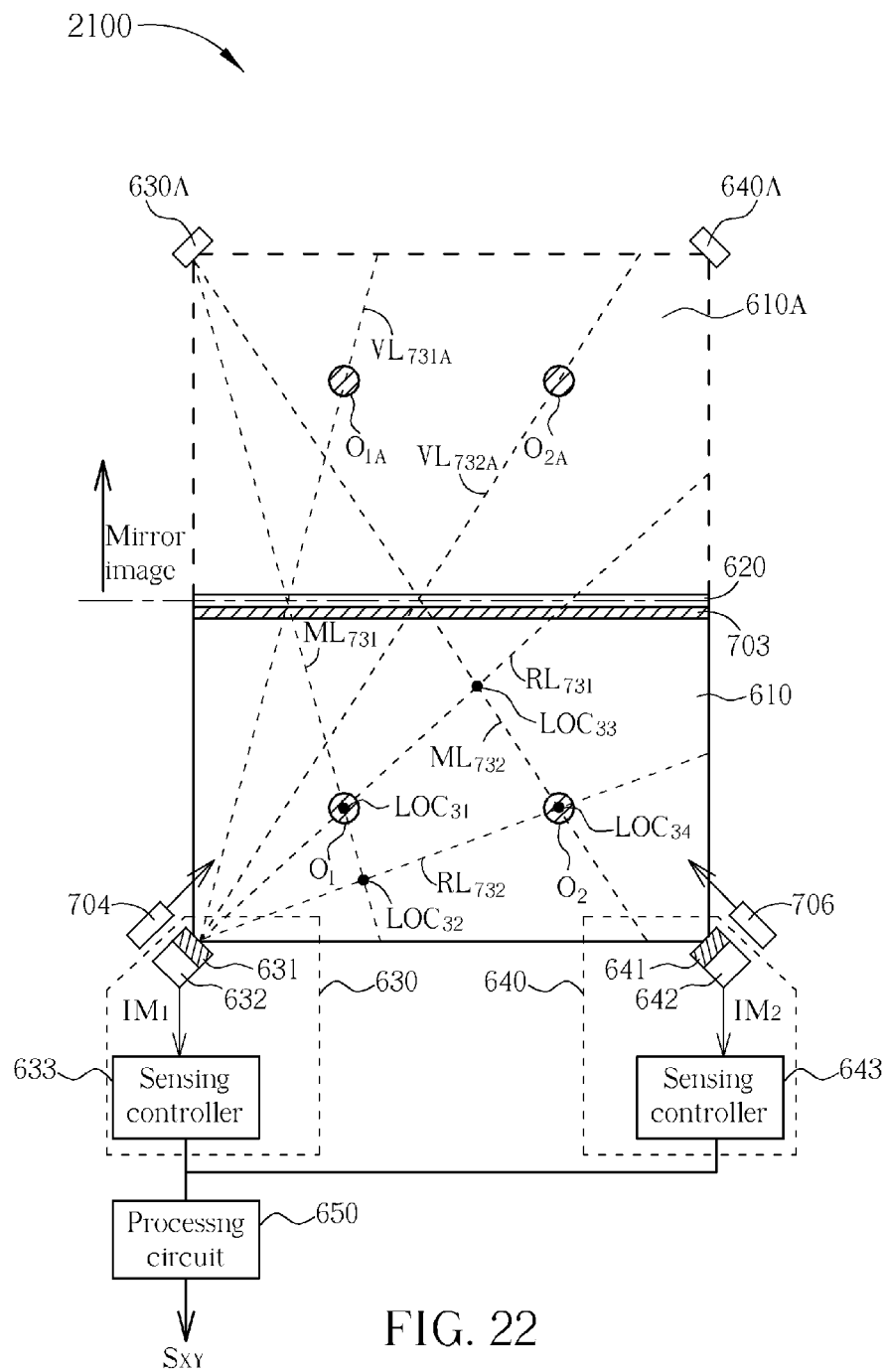
FIG. 22 and FIG. 23 are diagrams showing a first embodiment of an optical sensing system of the present invention.

As shown in FIG. 22, the processing circuit 650 determines real image blocking lines $RL_{731}$, $RL_{732}$ according to the positions of the real images captured by the image sensing module 630 and the position of the image sensing module 630, and the processing circuit 650 determines virtual image blocking lines $VL_{731A}$, $VL_{732A}$ according to the positions of the virtual images captured by the image sensing module 630 and the position of the image sensing module 630. Thereafter, the processing circuit 650 determines mirror image lines $ML_{731}$, $ML_{732}$ symmetric to the virtual image blocking lines $VL_{731A}$, $VL_{732A}$ according to the virtual image blocking lines $VL_{731A}$, $VL_{732A}$ and a position of the mirror image 630A of the image sensing module 630. The processing circuit 650 further generates the first set of candidate coordinates $LOC_{31}$~$LOC_{34}$ according to intersection points of the real image blocking lines $RL_{731}$, $RL_{732}$ and the mirror image lines $ML_{731}$, $ML_{732}$, where the first set of candidate coordinates $LOC_{31}$~$LOC_{34}$ are possible positions of the objects $O_1$ and $O_2$.

Figure 23:
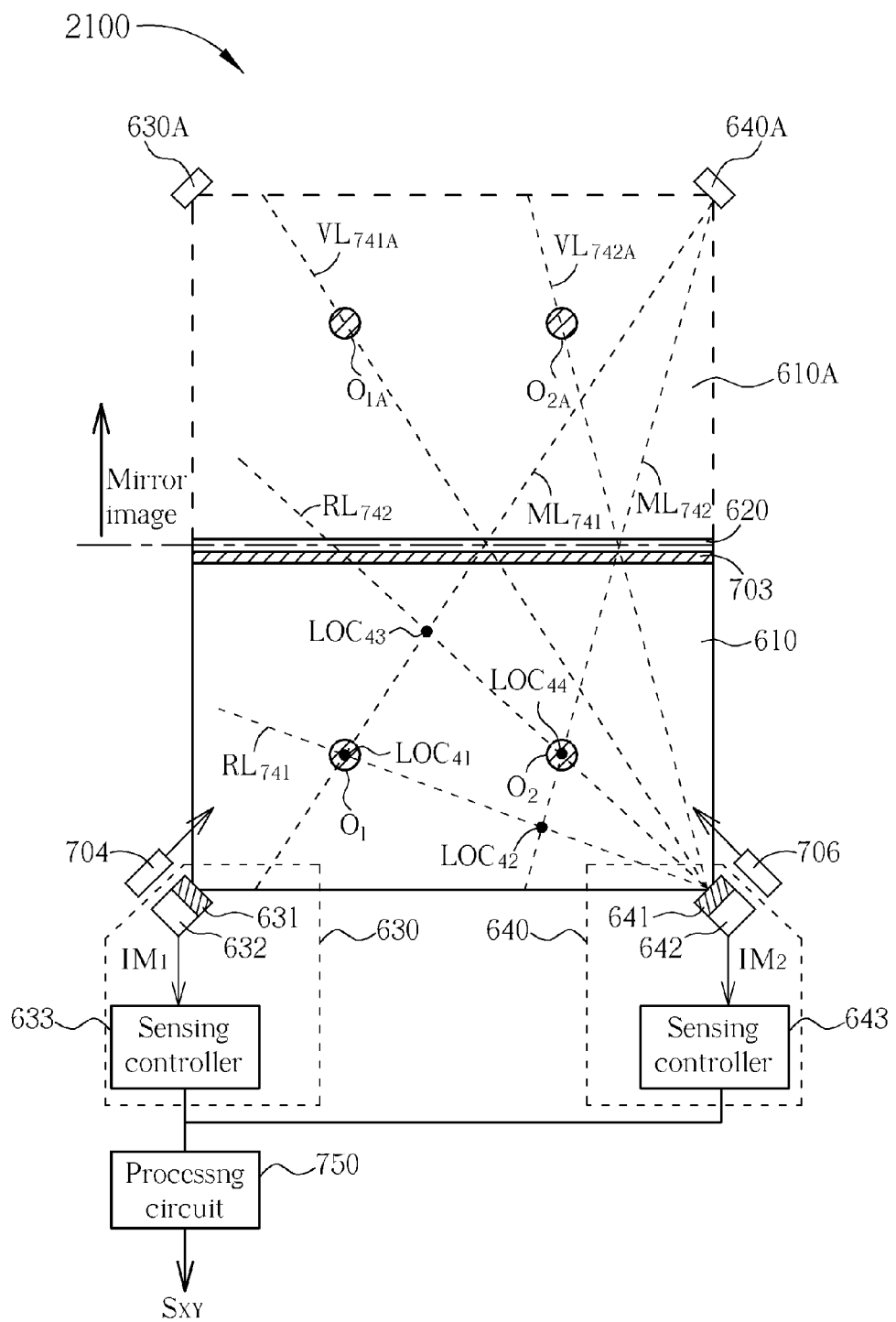

As shown in FIG. 23, the processing circuit 650 determines real image blocking lines $RL_{741}$, $RL_{742}$ according to the positions of the real images captured by the image sensing module 640 and the position of the image sensing module 640, and the processing circuit 650 determines virtual image blocking lines $VL_{741A}$, $VL_{742A}$, according to the positions of the virtual images captured by the image sensing module 640 and the position of the image sensing module 640. Thereafter, the processing circuit 650 determines mirror image lines $ML_{741}$, $ML_{742}$ symmetric to the virtual image blocking lines $VL_{741A}$, $VL_{742A}$ according to the virtual image blocking lines $VL_{741A}$, $VL_{742A}$ and a position of the mirror image 640A of the image sensing module 640. The processing circuit 650 further generates the second set of candidate coordinates $LOC_{41}$~$LOC_{44}$ according to intersection points of the real image blocking lines $RL_{741}$, $RL_{742}$ and the mirror image lines $ML_{741}$, $ML_{742}$, where the second set of candidate coordinates $LOC_{41}$~$LOC_{44}$ are possible positions of the objects $O_1$ and $O_2$.

The processing circuit 650 generates the output coordinates $S_{XY}$ of the objects $O_1$ and $O_2$ according to the first set of candidate coordinates $LOC_{31}$~$LOC_{34}$ and the second set of candidate coordinates $LOC_{41}$~$LOC_{44}$. For example, according to FIG. 22 and FIG. 23, the coordinates $LOC_{31}$ and $LOC_{34}$ of the first set of candidate coordinates $LOC_{31}$~$LOC_{34}$ are identical to the coordinates $LOC_{41}$ and $LOC_{44}$ of the second set of candidate coordinates $LOC_{41}$~$LOC_{44}$. The coordinate $LOC_{31}$ (or $LOC_{41}$) is the position of the object $O_1$, and the coordinate $LOC_{34}$ (or $LOC_{44}$) is the position of the object $O_2$. Therefore, the processing circuit 650 can generate the output coordinates $S_{xy}$ of the objects $O_1$ and $O_2$ according to the identical coordinates $LOC_{31}$, $LOC_{34}$, $LOC_{41}$, $LOC_{44}$ of the first set of candidate coordinates $LOC_{31}$~$LOC_{34}$ and the second set of candidate coordinates $LOC_{41}$~$LOC_{44}$.

Figure 24:
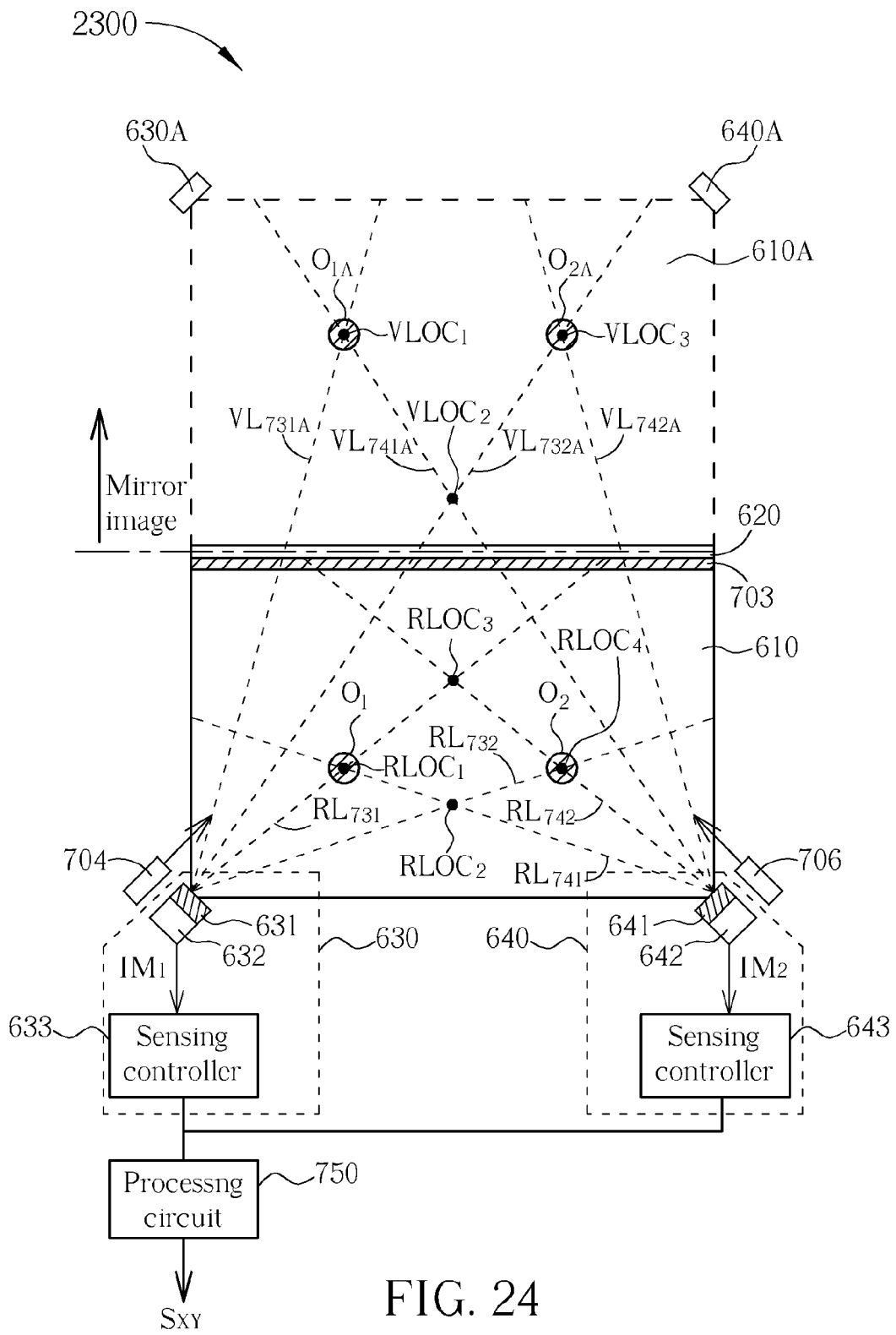
FIG. 24 and FIG. 25 are diagrams showing a second embodiment of an optical sensing system of the present invention.
Figure 25:
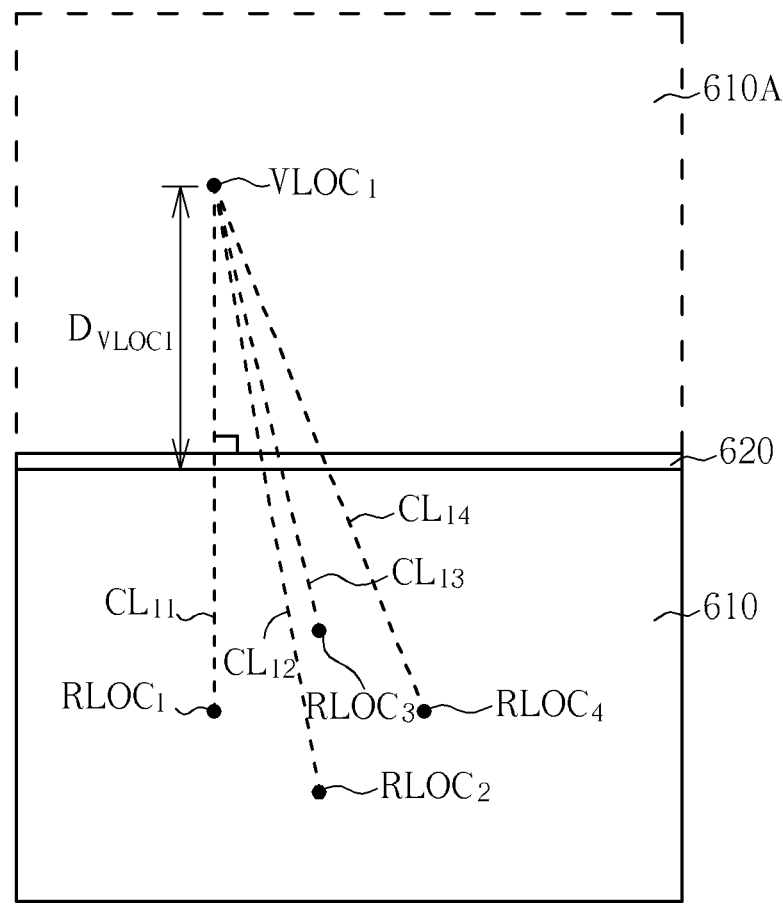

Please refer to FIG. 24 and FIG. 25. FIG. 24 and FIG. 25 are diagrams showing another embodiment of an optical sensing system 2300 of the present invention. The optical sensing system 2300 is for detecting positions of the objects $O_1$, $O_2$. The optical sensing system 2300 comprises a sensing area 610, a light filtering module 703, a mirror 620, light emitting elements 704 and 706, image sensing modules 630 and 640, and a processing circuit 750. The optical sensing system 2300 is similar to the optical sensing system 2100. A difference between the optical sensing system 2300 and the optical sensing system 2100 is the method for generating the output coordinates $S_{XY}$ of the processing circuit. More particularly, as shown in FIG. 24, the processing circuit 750 determines a first set of real image blocking lines $RL_{731}$, $RL_{732}$ according to the positions of the real images captured by the image sensor 633 and the position of the image sensing module 630, and the processing circuit 750 determines a second set of real image blocking lines $RL_{741}$, $RL_{742}$ according to the positions of the real images captured by the image sensor 643 and the position of the image sensing module 640. Because the objects $O_1$ and $O_2$ are both on the first set of real image blocking lines $RL_{731}$, $RL_{732}$ and the second set of real image blocking lines $RL_{741}$, $RL_{742}$, the processing circuit 750 can generate real image candidate coordinates $RLOC_1$~$RLOC_4$ of the objects $O_1$ and $O_2$ according to intersection points of the first set of real image blocking lines $RL_{731}$, $RL_{732}$ and the second set of real image blocking lines $RL_{741}$, $RL_{742}$. In addition, the processing circuit 750 determines a first set of virtual image blocking lines $VL_{731A}$, $VL_{732A}$ according to the positions of the virtual images captured by the image sensor 633 and the position of the image sensing module 630, and the processing circuit 750 determines a second set of virtual image blocking lines $VL_{741A}$, $VL_{742A}$ according to the positions of the virtual images captured by the image sensor 643 and the position of the image sensing module 640. Similarly, because the mirror images of the objects $O_{1A}$ and $O_{2A}$ are both on the first set of virtual image blocking lines $VL_{731A}$, $VL_{732A}$ and the second set of virtual image blocking lines $VL_{741A}$, $VL_{742A}$, the processing circuit 750 can generate virtual image candidate coordinates $VLOC_1$~$VLOC_3$ of the mirror images of the objects $O_{1A}$ and $O_{2A}$ according to intersection points of the first set of virtual image blocking lines $VL_{731A}$, $VL_{732A}$ and the second set of virtual image blocking lines $VL_{741A}$, $VL_{742A}$. Because the arrangement of the mirror images of the objects $O_{1A}$ and $O_{2A}$ is symmetric to the arrangement of the objects $O_1$ and $O_2$ in the sensing area 610, the processing circuit 750 can determine the positions of the objects $O_1$ and $O_2$ by detecting whether the real image candidate coordinates $RLOC_1$~$RLOC_4$ are symmetric to the virtual image candidate coordinates $VLOC_1$~$VLOC_3$. For example, the processing circuit 750 can first detect whether the virtual image candidate coordinate $VLOC_1$ is symmetric to one of the real image candidate coordinate $RLOC_1$~$RLOC_4$. As shown in FIG. 25, the processing circuit 750 computes a virtual image distance $D_{VLOC1}$ between the virtual image candidate coordinate $VLOC_1$ and the mirror 620. The processing circuit 750 generates candidate links $CL_{11}$~$CL_{14}$ according to the virtual image candidate coordinate $VLOC_1$ and the real image candidate coordinates $RLOC_1$~$RLOC_4$. When a length of one of the candidate links $CL_{11}$~$CL_{14}$ is two times the virtual image distance $D_{VLOC1}$, and the candidate link $CL_X$ is perpendicular to the mirror 620, the processing circuit 750 determines the virtual image candidate coordinate $VLOC_1$ is symmetric to the real image candidate coordinate $RLOC_x$ of the candidate link $CL_X$. Among the candidate links $CL_{11}$~$CL_{14}$, because a length of the candidate links $CL_{11}$ is two times the virtual image distance $D_{VLOC1}$, and the candidate link $CL_{11}$ is perpendicular to the mirror 620, the processing circuit 750 can determine the virtual image candidate coordinate $VLOC_1$ is symmetric to the real image candidate coordinate $RLOC_1$. The processing circuit 750 further determines an object is located on the real image candidate coordinate $RLOC_1$, such that the processing circuit 750 generates output coordinate of the object $O_1$ according to the real image candidate coordinate $RLOC_1$, and stores the output coordinate to the set of output coordinates $S_{XY}$. Thereafter, the processing circuit 750 can detect whether the virtual image candidate coordinate $VLOC_2$ is symmetric to one of the real image candidate coordinates $RLOC_1$~$RLOC_4$ according to the above method. Since the virtual image candidate coordinate $VLOC_2$ is not symmetric to one of the real image candidate coordinates $RLOC_1$~$RLOC_4$, the processing circuit 750 can determine there is no mirror image located on the virtual image candidate coordinate $VLOC_2$. Finally, the processing circuit 750 can also detect whether the virtual image candidate coordinate $VLOC_3$ is symmetric to one of the real image candidate coordinates $RLOC_1$~$RLOC_4$. Since the virtual image candidate coordinate $VLOC_3$ is symmetric to the real image candidate coordinate $RLOC_4$, the processing circuit 750 determines an object is located on the real image candidate coordinate $RLOC_4$, such that the processing circuit 750 generates output coordinate of the object $O_2$ according to the real image candidate coordinate $RLOC_4$, and stores the output coordinate to the set of output coordinates $S_{XY}$. According to the above illustration, the processing circuit 750 can generate the set of output coordinates $S_{XY}$ according to the real image candidate coordinates RLOC and the virtual image candidate coordinates VLOC.

Figure 26:
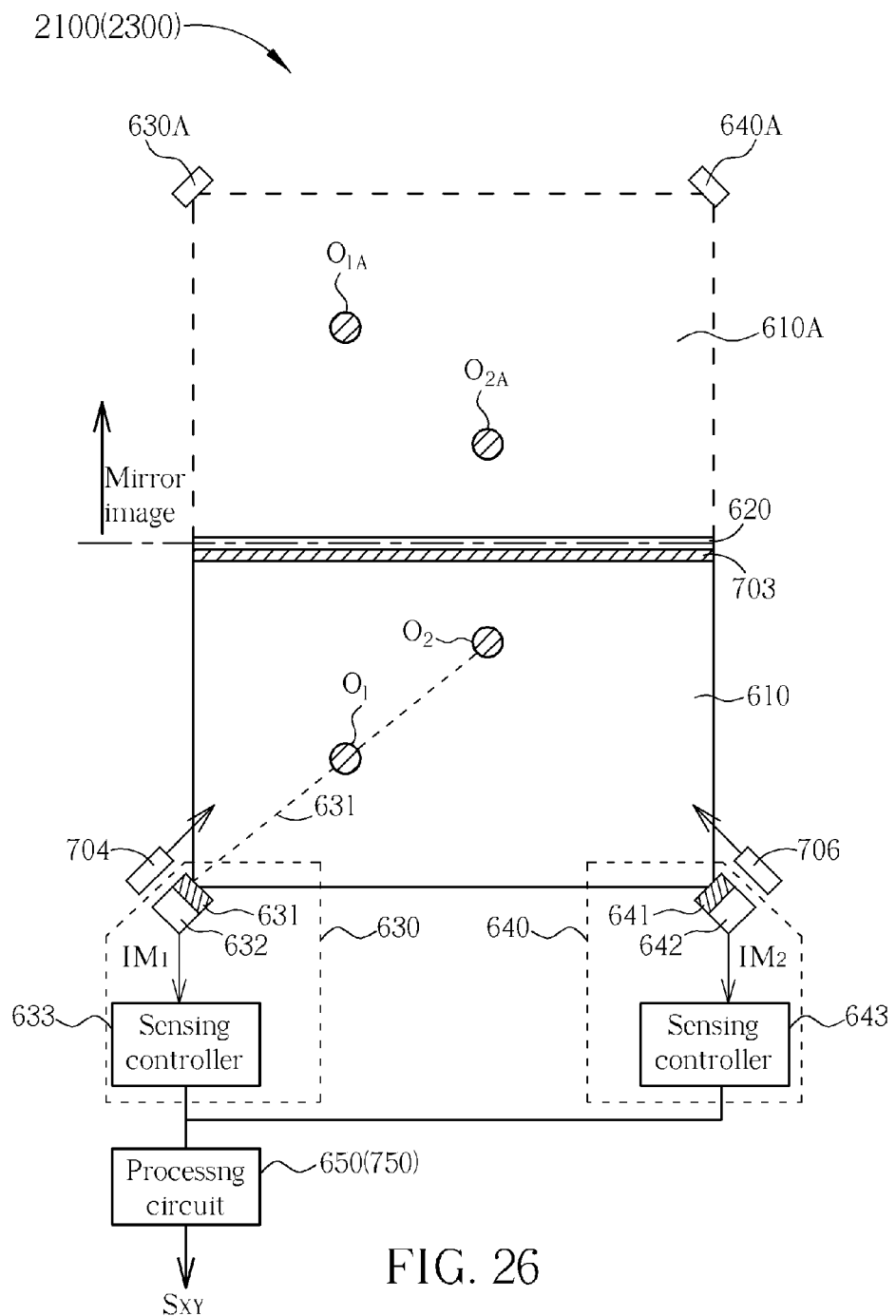
FIG. 26 is a diagram showing the optical sensing system of the present invention detecting positions of the objects according to part of real images of the objects captured by the image sensing module.

In addition, in the above optical sensing system 2100 (or 2300), the image sensing modules 630 and 640 can capture all of the real images and the mirror images of the objects $O_1$ and $O_2$. However, as shown in FIG. 26, when the objects $O_1$ and $O_2$ are both on a same light path 631, the sensing controller 633 can only capture part of the real images of the objects $O_1$ and $O_2$ in the image $IM_1$. In other words, according to different arrangements of the objects $O_1$ and $O_2$, the image sensing module 630 may only capture part of the real images of the objects (such as the object $O_1$), or only capture part of the mirror images of the objects in the mirror 620. Similarly, according to different arrangements of the objects $O_1$ and $O_2$, the image sensing module 640 may only capture part of the real images of the objects, or only capture part of the mirror images of the objects in the mirror 620. However, no matter whether the image sensing module 630, 640 captures all of the real images and the mirror images of the objects $O_1$ and $O_2$, the processing circuit 650 (or 750) can correctly compute the set of output coordinates $S_{xy}$ according to the above method.

Summarizing the above, the present invention provides an image sensing module for sensing real images and mirror images in a mirror of the objects through a plurality of first light filtering components with a first transmission spectrum and a plurality of second light filtering components with a second transmission spectrum by utilizing an image sensor, in order to generate an image. A light filtering module with the first transmission spectrum is arranged in front of the mirror. In contrast to the light for generating the real images, the light for generating the virtual images further passes through the light filtering module arranged in front of the mirror. Therefore, part of the light for generating the virtual images is filtered out by the light filtering module arranged in front of the mirror. When the image sensor receives light for generating the real/virtual images through the first light filtering components, the image sensor generates sensing signals with larger values. When the image sensor receives light for generating the real images through the second light filtering components, the image sensor still generates sensing signals with larger values. However, when the image sensor receives light for generating the virtual images through the second light filtering components, the image sensor generates sensing signals with smaller values. Therefore, in the image sensing module of the present invention, the sensing controller can determine the real images of the objects and the virtual images of the objects in the mirror according to first sub data corresponding to the light transmitted through the first light filtering components and second sub data corresponding to the light transmitted through the second light filtering components. In addition, the present invention further provides an optical sensing system utilizing the image sensing module. When the optical sensing system is utilized to sense multiple objects, the optical sensing system of the present invention can correctly detect the positions of the objects according to the real images of the objects and the virtual images of the objects captured by the two image sensing modules.

Those skilled in the art will readily observe that numerous modifications and alterations of the device and method may be made while retaining the teachings of the invention.

What is claimed is:

1. An image sensing module, comprising:
   a first light filtering module comprising a plurality of first light filtering components with a first transmission spectrum and a plurality of second light filtering components with a second transmission spectrum;
   an image sensor for generating a first image by receiving an image of multiple objects through the first light filtering module and receiving a mirror image of the objects reflected from a mirror through the first light filtering module, wherein a second light filtering module substantially having the first transmission spectrum is arranged in front of the mirror, the first image comprises a plurality of pixels, and each pixel comprises a first sub data corresponding to light transmitted through at least a first light filtering component and a second sub data corresponding to light transmitted through at least a second light filtering component, wherein the image sensor comprises a plurality of first sensing units and a plurality of second sensing units, the first sensing units and the second sensing units are interlacedly arranged, the first sub data is generated by using interpolation according to first sensing signals generated by the first sensing units, and the second sub data is generated by using interpolation according to second sensing signals generated by the second sensing units; and
   a sensing controller electrically connected to the image sensor, for determining a first set of real images of the objects and a first set of virtual images of the objects reflected from the mirror according to the first sub data and the second sub data of the plurality of pixels.

2. The image sensing module of claim 1 wherein the sensing controller determines an image area of the first image according to the first sub data of the plurality of pixels.

3. The image sensing module of claim 2 wherein when a first sub data of one of the plurality of pixels is greater than an image threshold value, the sensing controller determines the pixel is in the image area.

4. The image sensing module of claim 2 wherein the sensing controller determines whether a pixel in the image area belongs to the first set of real images or the first set of virtual images by comparing the first sub data and the second sub data of the pixel.

5. The image sensing module of claim 4 wherein when a result of subtracting the second sub data from the first sub data of the pixel in the image area is greater than a virtual image threshold value, the sensing controller determines the pixel belongs to the first set of virtual images.

6. The image sensing module of claim 4 wherein when a result of subtracting the second sub data from the first sub data of the pixel in the image area is less than a virtual image threshold value, the sensing controller determines the pixel belongs to the first set of real images.

7. The image sensing module of claim 2 wherein the first light filtering module further comprises a plurality of third light filtering components with a third transmission spectrum; wherein each of the pixels further comprises a third sub data corresponding to light transmitted through at least a third light filtering component, and the sensing controller determines the first set of real images of the objects and the first set of virtual images of the objects reflected from the mirror according to the first sub data, the second sub data, and the third sub data of the plurality of pixels.

8. The image sensing module of claim 7 wherein the sensing controller determines whether a pixel in the image area belongs to the first set of real images or the first set of virtual images according to the first sub data, the second sub data, and the third sub data of the pixel.

9. The image sensing module of claim 8 wherein when a result of subtracting the second sub data from the first sub data of the pixel in the image area is greater than a first virtual image threshold value, and a result of subtracting the third sub data from the first sub data of the pixel is greater than a second virtual image threshold value, the sensing controller determines the pixel belongs to the first set of virtual image.

10. The image sensing module of claim 8 wherein when a result of subtracting the second sub data from the first sub data of the pixel in the image area is less than a first virtual image threshold value, and a result of subtracting the third sub data from the first sub data of the pixel is less than a second virtual image threshold value, the sensing controller determines the pixel belongs to the first set of real image.

11. An optical sensing system, comprising:
a sensing area with a plurality of edges;
a first light filtering module with a first transmission spectrum;
a mirror for generating a mirror image of the sensing area by receiving and reflecting light through the first light filtering module;
a first image sensing module, comprising:
a second light filtering module comprising a plurality of first light filtering components with the first transmission spectrum and a plurality of second light filtering components with a second transmission spectrum;
a first image sensor for generating a first image by receiving an image of multiple objects through the second light filtering module and receiving a mirror image of the objects reflected from the mirror through the second light filtering module, wherein the first image comprises a plurality of first pixels, and each first pixel comprises a first sub data corresponding to light transmitted through at least a first light filtering component and a second sub data corresponding to light transmitted through at least a second light filtering component, wherein the first image sensor comprises a plurality of first sensing units and a plurality of second sensing units, the first sensing units and the second sensing units are interlacedly arranged, the first sub data is generated by using interpolation according to first sensing signals generated by the first sensing units, and the second sub data is generated by using interpolation according to second sensing signals generated by the second sensing units; and
a first sensing controller electrically connected to the first image sensor, for determining a first set of real images of the objects and a first set of virtual images of the objects reflected from the mirror according to the first sub data and the second sub data of the plurality of first pixels; and
a processing circuit electrically connected to the first sensing controller, for generating a first set of candidate coordinates of the objects according to the first set of real images and the first set of virtual images.

12. The optical sensing system of claim 11 wherein the first sensing controller determines an image area of the first image according to the first sub data of the plurality of first pixels.

13. The optical sensing system of claim 12 wherein when a first sub data of one of the plurality of first pixels is greater than an image threshold value, the first sensing controller determines the first pixel is in the image area.

14. The optical sensing system of claim 12 wherein the first sensing controller determines whether a first pixel in the image area belongs to the first set of real images or the first set of virtual images by comparing the first sub data and the second sub data of the first pixel.

15. The optical sensing system of claim 14 wherein when a result of subtracting the second sub data from the first sub data of the first pixel in the image area is greater than a virtual image threshold value, the sensing controller determines the first pixel belongs to the first set of virtual images.

16. The optical sensing system of claim 14 wherein when a result of subtracting the second sub data from the first sub data of the first pixel in the image area is less than a virtual image threshold value, the sensing controller determines the first pixel belongs to the first set of real images.

17. The optical sensing system of claim 12 wherein the second light filtering module further comprises a plurality of third light filtering components with a third transmission spectrum; wherein each of the first pixels further comprises a third sub data corresponding to light transmitted through at least a third light filtering component, and the first sensing controller determines the first set of real images of the objects and the first set of virtual images of the objects reflected from the mirror according to the first sub data, the second sub data, and the third sub data of the plurality of first pixels.

18. The optical sensing system of claim 17 wherein the first sensing controller determines whether a first pixel in the image area belongs to the first set of real images or the first set of virtual images according to the first sub data, the second sub data, and the third sub data of the first pixel.

19. The optical sensing system of claim 18 wherein when a result of subtracting the second sub data from the first sub data of the first pixel in the image area is greater than a first virtual image threshold value, and a result of subtracting the third sub data from the first sub data of the first pixel is greater than a second virtual image threshold value, the first sensing controller determines the first pixel belongs to the first set of virtual image.

20. The image sensing module of claim 18 wherein when a result of subtracting the second sub data from the first sub data of the first pixel in the image area is less than a first virtual image threshold value, and a result of subtracting the third sub data from the first sub data of the first pixel is less than a second virtual image threshold value, the sensing controller determines the first pixel belongs to the first set of real image.

21. The optical sensing system of claim 11 further comprising a third light filtering module with a third transmission spectrum; wherein the mirror comprises a first area for receiving and reflecting light through the first light filtering module, and a second area for receiving and reflecting light through the third light filtering module.

22. The optical sensing system of claim 11 further comprising a light emitting element for emitting light to the sensing area.

23. The optical sensing system of claim 22, wherein the light emitting element is arranged nearby the first image sensing module.

24. The optical sensing system of claim 11, wherein the first transmission spectrum is a red color transmission spectrum, and the second transmission spectrum is a green or blue color transmission spectrum.

25. The optical sensing system of claim 11 further comprising:
a second image sensing module, comprising:
a third light filtering module comprising a plurality of third light filtering components with the first transmission spectrum and a plurality of fourth light filtering components with the second transmission spectrum;

a second image sensor for generating a second image by receiving an image of the objects through the third light filtering module and receiving a mirror image of the objects reflected from the mirror through the second light filtering module, wherein the second image comprises a plurality of second pixels, and each second pixel comprises a third sub data corresponding to light transmitted through at least a third light filtering component and a fourth sub data corresponding to light transmitted through at least a fourth light filtering component; and a second sensing controller electrically connected to the second image sensor, for determining a second set of real images of the objects and a second set of virtual images of the objects reflected from the mirror according to the third sub data and the fourth sub data of the plurality of second pixels;

wherein the processing circuit generates a second set of candidate coordinates of the objects according to the second set of real images and the second set of virtual images, and the processing circuit compares the first set of candidate coordinates and the second set of candidate coordinates.

26. An optical sensing system, comprising:

a sensing area with a plurality of edges;

a first light filtering module with a first transmission spectrum;

a mirror for generating a mirror image of the sensing area by receiving and reflecting light through the first light filtering module;

a first image sensing module, comprising:

a second light filtering module comprising a plurality of first light filtering components with the first transmission spectrum and a plurality of second light filtering components with a second transmission spectrum;

a first image sensor for generating a first image by receiving an image of multiple objects through the second light filtering module and receiving a mirror image of the objects reflected from the mirror through the second light filtering module, wherein the first image comprises a plurality of first pixels, and each first pixel comprises a first sub data corresponding to light transmitted through at least a first light filtering component and a second sub data corresponding to light transmitted through at least a second light filtering component, wherein the first image sensor comprises a plurality of first sensing units and a plurality of second sensing units, the first sensing units and the second sensing units are interlacedly arranged, the first sub data is generated by using interpolation according to first sensing signals generated by the first sensing units, and the second sub data is generated by using interpolation according to second sensing signals generated by the second sensing units; and a first sensing controller electrically connected to the first image sensor, for determining a first set of real images of the objects and a first set of virtual images of the objects reflected from the mirror according to the first sub data and the second sub data of the plurality of first pixels;

a second image sensing module, comprising:

a third light filtering module comprising a plurality of third light filtering components with the first transmission spectrum and a plurality of fourth light filtering components with the second transmission spectrum;

a second image sensor for generating a second image by receiving an image of the objects through the third light filtering module and receiving a mirror image of the objects reflected from the mirror through the second light filtering module, wherein the second image comprises a plurality of second pixels, and each second pixel comprises a third sub data corresponding to light transmitted through at least a third light filtering component and a fourth sub data corresponding to light transmitted through at least a fourth light filtering component; and a second sensing controller electrically connected to the second image sensor, for determining a second set of real images of the objects and a second set of virtual images of the objects reflected from the mirror according to the third sub data and the fourth sub data of the plurality of second pixels; and a processing circuit electrically connected to the first sensing controller and the second sensing controller, for generating a set of real image candidate coordinates of the objects according to the first set of real images and the second set of real images, and generating a set of virtual image candidate coordinates of the objects according to the first set of virtual images and the second set of virtual images, the processing circuit further generating a set of output coordinates according to the set of real image candidate coordinates and the set of virtual image candidate coordinates.

27. The optical sensing system of claim 26 wherein the first sensing controller determines an image area of the first image according to the first sub data of the plurality of first pixels.

28. The optical sensing system of claim 27 wherein when a first sub data of one of the plurality of first pixels is greater than an image threshold value, the first sensing controller determines the first pixel is in the image area.

29. The optical sensing system of claim 27 wherein the first sensing controller determines whether a first pixel in the image area belongs to the first set of real images or the first set of virtual images by comparing the first sub data and the second sub data of the first pixel.

30. The optical sensing system of claim 29 wherein when a result of subtracting the second sub data from the first sub data of the first pixel in the image area is greater than a virtual image threshold value, the sensing controller determines the first pixel belongs to the first set of virtual image.

31. The optical sensing system of claim 29 wherein when a result of subtracting the second sub data from the first sub data of the first pixel in the image area is less than a virtual image threshold value, the sensing controller determines the first pixel belongs to the first set of real image.

32. The optical sensing system of claim 27 wherein the second light filtering module further comprises a plurality of fifth light filtering components with a third transmission spectrum; wherein each of the first pixels further comprises a third sub data corresponding to light transmitted through at least a fifth light filtering component, and the first sensing controller determines the first set of real images of the objects and the first set of virtual images of the objects reflected from the mirror according to the first sub data, the second sub data, and the third sub data of the plurality of first pixels.

33. The optical sensing system of claim 32 wherein the first sensing controller determines whether a first pixel in the image area belongs to the first set of real images or the first set of virtual images according to a first sub data, a second sub data, and a third sub data of the first pixel.

34. The optical sensing system of claim 33 wherein when a result of subtracting the second sub data from the first sub data of the first pixel in the image area is greater than a first virtual image threshold value, and a result of subtracting the third sub data from the first sub data of the first pixel is greater than a second virtual image threshold value, the first sensing controller determines the first pixel belongs to the first set of virtual images.

35. The image sensing module of claim 33 wherein when a result of subtracting the second sub data from the first sub data of the first pixel in the image area is less than a first virtual image threshold value, and a result of subtracting the third sub data from the first sub data of the first pixel is less than a second virtual image threshold value, the sensing controller determines the first pixel belongs to the first set of real images.

36. The optical sensing system of claim 26 further comprising a fourth light filtering module with a third transmission spectrum; wherein the mirror comprises a first area for receiving and reflecting light through the first light filtering module, and a second area for receiving and reflecting light through the fourth light filtering module.

37. The optical sensing system of claim 26 further comprising a light emitting element for emitting light to the sensing area.

38. The optical sensing system of claim 37, wherein the light emitting element is arranged nearby the first image sensing module.

39. The optical sensing system of claim 26, wherein the first transmission spectrum is a red color transmission spectrum, and the second transmission spectrum is a green or blue color transmission spectrum.

* * * * *